(12) United States Patent
Kuma et al.

(10) Patent No.: US 12,190,549 B2
(45) Date of Patent: Jan. 7, 2025

(54) INFORMATION PROCESSING DEVICE AND METHOD

(71) Applicant: SONY GROUP CORPORATION, Tokyo (JP)

(72) Inventors: Satoru Kuma, Tokyo (JP); Ohji Nakagami, Tokyo (JP); Koji Yano, Tokyo (JP); Hiroyuki Yasuda, Saitama (JP); Tsuyoshi Kato, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 327 days.

(21) Appl. No.: 17/622,488

(22) PCT Filed: Jun. 18, 2020

(86) PCT No.: PCT/JP2020/023989
§ 371 (c)(1),
(2) Date: Dec. 23, 2021

(87) PCT Pub. No.: WO2021/002214
PCT Pub. Date: Jan. 7, 2021

(65) Prior Publication Data
US 2022/0245863 A1   Aug. 4, 2022

(30) Foreign Application Priority Data
Jul. 2, 2019   (JP) ................. 2019-124027

(51) Int. Cl.
*G06T 9/00*   (2006.01)
*G06T 9/40*   (2006.01)
*G06T 17/00*  (2006.01)

(52) U.S. Cl.
CPC .............. *G06T 9/40* (2013.01); *G06T 17/005* (2013.01)

(58) Field of Classification Search
CPC ......... G06T 9/40; G06T 17/005; G06T 9/001; G06T 9/004; G06T 9/00; H04N 19/105;
(Continued)

(56) References Cited

U.S. PATENT DOCUMENTS

2017/0347122 A1* 11/2017 Chou .................. G06T 9/00
2019/0080483 A1   3/2019 Mammou
(Continued)

FOREIGN PATENT DOCUMENTS

CN   1708132 A    12/2005
EP   3975124 A1    3/2022
(Continued)

OTHER PUBLICATIONS

Mammou et al., Lifting Scheme for Lossy Attribute Encoding in TMC1, International Organisation for Standardisation ISO/IEC JTC1/SC29/WG11 Coding of Moving Pictures and Audio, Apr. 2018, pp. 1-9, San Diego, US.
(Continued)

*Primary Examiner* — Ping Y Hsieh
*Assistant Examiner* — Xiao Liu
(74) *Attorney, Agent, or Firm* — Paratus Law Group, PLLC

(57) ABSTRACT

There is provided an information processing device, an image processing device, an encoding device, a decoding device, an electronic apparatus, an information processing method, or a program for processing attribute information of each point of a point cloud representing an object in a three-dimensional shape as a set of points, a first level is hierarchized using a first hierarchization method and a second level different from the first level is hierarchized using a second hierarchization method different from the first hierarchization method at the time of performing hierarchization of attribute information by recursively repeating
(Continued)

processing of, among points classified as a predictive point or a reference point, deriving a difference value between a predictive value of attribute information of the predictive point derived using attribute information of the reference point and the attribute information of the predictive point for the reference point to perform hierarchization of the attribute information.

20 Claims, 17 Drawing Sheets

(58) Field of Classification Search
CPC .. H04N 19/119; H04N 19/187; H04N 19/597; H04N 19/30; H04N 19/70
See application file for complete search history.

(56) References Cited

U.S. PATENT DOCUMENTS

| 2019/0081638 A1* | 3/2019 | Mammou | H04N 19/436 |
| 2022/0159284 A1* | 5/2022 | Hur | H04N 19/70 |

FOREIGN PATENT DOCUMENTS

| JP | H10124476 A | 5/1998 |
| JP | 2020530240 | 7/2019 |
| WO | WO 2019/103009 A1 | 5/2019 |
| WO | WO 2020/013249 A1 | 1/2020 |

OTHER PUBLICATIONS

Nakagami et al., [G-PCC] Spatial scalability support for G-PCC, International Organisation for Standardisation ISO/IEC JTC1/SC29/WG11 Coding of Moving Pictures and Audio, Mar. 2019, pp. 1-15, Geneva, CH.

Mekuria et al., Design, Implementation and Evaluation of a Point Cloud Codec for Tele-Immersive Video, IEEE Transactions on Circuits and Systems for Video Technology, Jan. 2016, pp. 1-14.

"PCC WD G-PCC (Geometry-based PCC)", 125. MPEG Meeting; Jan. 14, 2019-Jan. 18, 2019; Marrakech; (Motion Picture Expert Group or ISO/IEC JTC1/SC29/WG11, n18179); Mar. 21, 2019.

Hyejung Hur (LGE) et al: "[G-PCC] [New Proposal] on improved spatial scalable lifting", 128. MPEG Meeting; Oct. 7, 2019-Oct. 11, 2019; Geneva; (Motion Picture Expert Group or ISO/IEC JTC1/SC29/WG11), No. m51408; Oct. 7, 2019 (Oct. 7, 2019), XP030221738.

Khaled Mammou et al: "G-PCC codec description v2", ITU-T Draft; Study Period 2017-2020; Study Group 15; Series C1, International Telecommunication Union, Geneva; CH vol. ties/16, No. n18189; Mar. 8, 2019 , pp. 1-39; XP044260571.

Satoru Kuma (Sony) et al: "[G-PCC] (New Proposal) CE13.15 Related on improved spatial scalable lifting", 127. MPEG Meeting; Jul. 8, 2019-Jul. 12, 2019; Gothenburg; (Motion Picture Expert Group or ISO/IEC JTC1/SC29/WG11), No. m49044 Jul. 4, 2019 (Jul. 4, 2019), XP030207212.

* cited by examiner

Fig. 5

| METHOD 1 | | ATTRIBUTE INFORMATION HIERARCHIZATION METHODS ARE SWITCHED AT MIDDLE LEVEL |
|---|---|---|
| | METHOD 1-1 | SCALABLE ADAPTED METHOD AND SCALABLE NONADAPTED METHOD ARE SWITCHED (SOME LEVELS ARE HIERARCHIZED THROUGH SCALABLE ADAPTED METHOD) |
| | METHOD 1-1-1 | HIGHER LEVEL IS HIERARCHIZED THROUGH SCALABLE NONADAPTED METHOD AND LOWER LEVEL IS HIERARCHIZED THROUGH SCALABLE ADAPTED METHOD |
| | METHOD 1-1-1-1 | SWITCHING OF SCALABLE ADAPTED LIFTING AND SCALABLE NONADAPTED LIFTING |
| | METHOD 1-2 | SWITCHING OF SAMPLING ACCORDING TO DISTANCE AND SAMPLING AT EQUAL INTERVALS IN MORTON ORDER |
| | METHOD 1-3 | PROCESSING ORDER: SEQUENTIAL HIERARCHIZATION FROM LOWEST LEVEL |
| | METHOD 1-4 | SIGNALING OF CONTROL INFORMATION |
| METHOD 2 | | INVERSE HIERARCHIZATION METHODS FOR ATTRIBUTE INFORMATION ARE SWITCHED AT MIDDLE LEVEL |
| | METHOD 2-1 | SCALABLE ADAPTED METHOD AND SCALABLE NONADAPTED METHOD ARE SWITCHED (SOME LEVELS ARE INVERSELY HIERARCHIZED THROUGH SCALABLE ADAPTED METHOD) |
| | METHOD 2-1-1 | HIGHER LEVEL IS INVERSELY HIERARCHIZED THROUGH SCALABLE NONADAPTED METHOD AND LOWER LEVEL IS INVERSELY HIERARCHIZED THROUGH SCALABLE ADAPTED METHOD |
| | METHOD 2-1-1-1 | SWITCHING OF SCALABLE ADAPTED LIFTING AND SCALABLE NONADAPTED LIFTING |
| | METHOD 2-2 | SWITCHING OF SAMPLING ACCORDING TO DISTANCE AND SAMPLING AT EQUAL INTERVALS IN MORTON ORDER |
| | METHOD 2-3 | (SWITCHING OF METHODS FOR) INVERSE HIERARCHIZATION BASED ON CONTROL INFORMATION |

Fig. 9

| METHOD 3 | NODES OF PROCESSING TARGET LEVEL ARE MERGED INTO NODES OF LEVEL HIGHER BY ONE LEVEL TO CONSTRUCT REFERENCE RELATIONS IN HIERARCHICAL STRUCTURE OF ATTRIBUTE INFORMATION |
|---|---|
| METHOD 3-1 | WHEN NUMBER OF NODES OF PROCESSING TARGET LEVEL IS GREATER THAN THAT OF LEVEL HIGHER BY ONE LEVEL |
| METHOD 3-2 | SIGNALING OF CONTROL INFORMATION |
| METHOD 4 | REFERENCE DESTINATION OF NODES OF PROCESSING TARGET LEVEL IS SEARCHED FOR AT LEVEL HIGHER BY TWO LEVELS IN INVERSE HIERARCHIZATION |
| METHOD 4-1 | BASED ON CONTROL INFORMATION |

INFORMATION PROCESSING DEVICE AND METHOD

CROSS REFERENCE TO PRIOR APPLICATION

This application is a National Stage Patent Application of PCT International Patent Application No. PCT/JP2020/023989 (filed on Jun. 18, 2020) under 35 U.S.C. § 371, which claims priority to Japanese Patent Application No. 2019-124027 (filed on Jul. 2, 2019), which are all hereby incorporated by reference in their entirety.

TECHNICAL FIELD

The present disclosure relates to an information processing device and method, and particularly, to an information processing device and method capable of curbing reduction in encoding efficiency

BACKGROUND ART

A conventional method of coding 3D data representing a three-dimensional structure such as a point cloud, for example, was devised (refer to NPL 1, for example). Point cloud data is composed of geometry data (also called position information) and attribute data (also called attribute information) of each point. Accordingly, coding of the point cloud is separately performed with respect to the geometry data and the attribute data. As a method of coding attribute data, various methods have been proposed. For example, a method using a technique such as lifting was proposed (refer to NPL 2, for example). In addition, a method capable of scalably decoding attribute data was also proposed (refer to NPL 3, for example).

CITATION LIST

Non Patent Literature

NPL 1

R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf

NPL 2

Khaled Mammou, Alexis Tourapis, Jungsun Kim, Fabrice Robinet, Valery Valentin, Yeping Su, "Lifting Scheme for Lossy Attribute Encoding in TMC1", ISO/IEC JTC1/SC29/WG11 MPEG2018/m42640, April 2018, San Diego, US

NPL 3

Ohji Nakagami, Satoru Kuma, "[G-PCC] Spatial scalability support for G-PCC", ISO/IEC JTC1/SC29/WG11 MPEG2019/m47352, March 2019, Geneva, CH

SUMMARY

Technical Problem

However, each of these methods has its own characteristics and all methods may not always be optimal in all cases. For example, a method employing the technique described in NPL 3 can perform scalable decoding of attribute information which is difficult to perform in a method employing lifting described in NPL 2. However, the encoding efficiency may be reduced in a method employing the technique described in NPL 3 compared with a method employing lifting described in NPL 2, in general.

In view of such situations, the present disclosure is directed to curb reduction in encoding efficiency.

Solution to Problem

An information processing device of one aspect of the present technology is an information processing device for processing attribute information of each point of a point cloud representing an object in a three-dimensional shape as a set of points, the information processing device including a hierarchization unit configured to recursively repeat processing of, among points classified as a predictive point or a reference point, deriving a difference value between a predictive value of the attribute information of the predictive point derived using the attribute information of the reference point and the attribute information of the predictive point for the reference point to perform hierarchization of the attribute information, wherein the hierarchization unit hierarchizes a first level using a first hierarchization method and hierarchizes a second level different from the first level using a second hierarchization method different from the first hierarchization method.

An information processing method of one aspect of the present technology is an information processing method for generating different levels according to a plurality of hierarchization methods using the plurality of hierarchization methods, with respect to attribute information of each point of a point cloud representing an object in a three-dimensional shape as a set of points, at the time of performing hierarchization of the attribute information by recursively repeating processing of classifying points as a predictive point or a reference point, deriving a predictive value of the attribute data of the predictive point using the attribute data of the reference point, and deriving a difference value between the attribute information of the predictive point and the predictive value for the reference point.

An information processing device of another aspect of the present technology is an information processing device for processing attribute information of each point of a point cloud representing an object in a three-dimensional shape as a set of points, the information processing device including an inverse hierarchization unit configured to perform inverse hierarchization on attribute information hierarchized by recursively repeating processing of, among points classified as a predictive point or a reference point, deriving a difference value between a predictive value of the attribute information of the predictive point derived using the attribute information of the reference point and the attribute information of the predictive point for the reference point, wherein the inverse hierarchization unit inversely hierarchizes a first level using a first hierarchization method and inversely hierarchizes a second level different from the first level using a second hierarchization method different from the first hierarchization method.

An information processing method of another aspect of the present technology is an information processing method for performing inverse hierarchization on different levels according to a plurality of hierarchization methods using the plurality of hierarchization methods, with respect to attribute information of each point of a point cloud representing an object in a three-dimensional shape as a set of points, at the time of performing the inverse hierarchization of the attribute information hierarchized by recursively repeating processing of classifying points as a predictive point or a reference point, deriving a predictive value of the attribute data of the predictive point using the attribute data of the reference point, and deriving a difference value between the attribute information of the predictive point and the predictive value for the reference point.

An information processing device of yet another aspect of the present technology is an information processing device for processing attribute information of each point of a point cloud representing an object in a three-dimensional shape as a set of points, the information processing device including a hierarchization unit configured to recursively repeat processing of, among points classified as a predictive point or a reference point, deriving a difference value between a predictive value of the attribute information of the predictive point derived using the attribute information of the reference point and the attribute information of the predictive point for the reference point to perform hierarchization of the attribute information, wherein the hierarchization unit derives the predictive values of the predictive points of a plurality of levels with reference to the reference points of the same levels.

An information processing method of yet another aspect of the present technology is an information processing method for, with respect to attribute information of each point of a point cloud representing an object in a three-dimensional shape as a set of points, at the time of performing hierarchization of the attribute information by recursively repeating processing of classifying points as a predictive point or a reference point, deriving a predictive value of the attribute information of the predictive point using the attribute information of the reference point, and deriving a difference value between the attribute information of the predictive point and the predictive value for the reference point, deriving the predictive values of the predictive points of a plurality of levels with reference to the reference points of the same levels.

An information processing device of yet another aspect of the present technology is an information processing device for processing attribute information of each point of a point cloud representing an object in a three-dimensional shape as a set of points, the information processing device including an inverse hierarchization unit configured to perform inverse hierarchization on attribute information hierarchized by recursively repeating processing of, among points classified as a predictive point or a reference point, deriving a difference value between a predictive value of the attribute information of the predictive point derived using the attribute information of the reference point and the attribute information of the predictive point for the reference point, wherein the inverse hierarchization unit derives the predictive values of the attribute information of the predictive points of a plurality of levels with reference to the attribute information of the reference points of the same levels and generates the attribute information of the predictive point by adding the derived predictive values to the difference values at the time of the inverse hierarchization.

An information processing method of yet another aspect of the present technology is an information processing method for, with respect to attribute information of each point of a point cloud representing an object in a three-dimensional shape as a set of points, at the time of performing inverse hierarchization of the attribute information hierarchized by recursively repeating processing of classifying points as a predictive point or a reference point, deriving a predictive value of the attribute information of the predictive point using the attribute information of the reference point, and deriving a difference value between the attribute information of the predictive point and the predictive value for the reference point, deriving the predictive values of the attribute information of the predictive points of a plurality of levels with reference to the attribute information of the reference points of the same levels and generating the attribute information of the predictive point by adding the derived predictive values to the difference values.

In the information processing device and method of one aspect of the present technology, with respect to attribute information of each point of a point cloud representing an object in a three-dimensional shape as a set of points, different levels are generated according to a plurality of hierarchization methods using the plurality of hierarchization methods at the time of performing hierarchization of the attribute information by recursively repeating processing of classifying points as a predictive point or a reference point, deriving a predictive value of the attribute information of the predictive point using the attribute information of the reference point, and deriving a difference value between the attribute information of the predictive point and the predictive value for the reference point.

In the information processing device and method of another aspect of the present technology, with respect to attribute information of each point of a point cloud representing an object in a three-dimensional shape as a set of points, inverse hierarchization is performed on different levels according to a plurality of hierarchization methods using the plurality of hierarchization methods at the time of performing inverse hierarchization on attribute information hierarchized by recursively repeating processing of classifying points as a predictive point or a reference point, deriving a predictive value of the attribute information of the predictive point using the attribute information of the reference point, and deriving a difference value between the attribute information of the predictive point and the predictive value for the reference point.

In the information processing device and method of yet another aspect of the present technology, with respect to attribute information of each point of a point cloud representing an object in a three-dimensional shape as a set of points, predictive values of predictive points of a plurality of levels are derived with reference to reference points of the same levels at the time of performing hierarchization of attribute information by recursively repeating processing of classifying points as a predictive point or a reference point, deriving a predictive value of the attribute information of the predictive point using the attribute information of the reference point, and deriving a difference value between the attribute information of the predictive point and the predictive value for the reference point.

In the information processing device and method of yet another aspect of the present technology, with respect to attribute information of each point of a point cloud representing an object in a three-dimensional shape as a set of points, at the time of performing inverse hierarchization of attribute information hierarchized by recursively repeating processing of classifying points as a predictive point or a reference point, deriving a predictive value of the attribute information of the predictive point using the attribute information of the reference point, and deriving a difference value between the attribute information of the predictive point and the predictive value for the reference point, predictive values of attribute information of predictive points of a plurality of levels are derived with reference to attribute information of reference points of the same levels and attribute information of the predictive points is generated by adding the derived predictive values are added to the difference values.

BRIEF DESCRIPTION OF DRAWINGS

FIG. 5 is a diagram for describing an attribute data hierarchization method.
FIG. 9 is a diagram for describing an attribute data hierarchization method.
FIG. 14 is a flowchart for describing an example of an encoding processing flow.
FIG. 15 is a flowchart for describing an example of attribute information encoding processing flow.
FIG. 16 is a flowchart for describing an example of a hierarchization processing flow.
FIG. 20 is a flowchart for describing an example of a decoding processing flow.
FIG. 21 is a flowchart for describing an example of an attribute information decoding processing flow.
FIG. 22 is a flowchart for describing an example of an inverse hierarchization processing flow.
FIG. 23 is a flowchart for describing an example of a scalable inverse hierarchization processing flow.
FIG. 24 is a flowchart for describing an example of a hierarchization processing flow.
FIG. 25 is a flowchart for describing an example of an inverse hierarchization processing flow.

DESCRIPTION OF EMBODIMENTS

Figure 1:
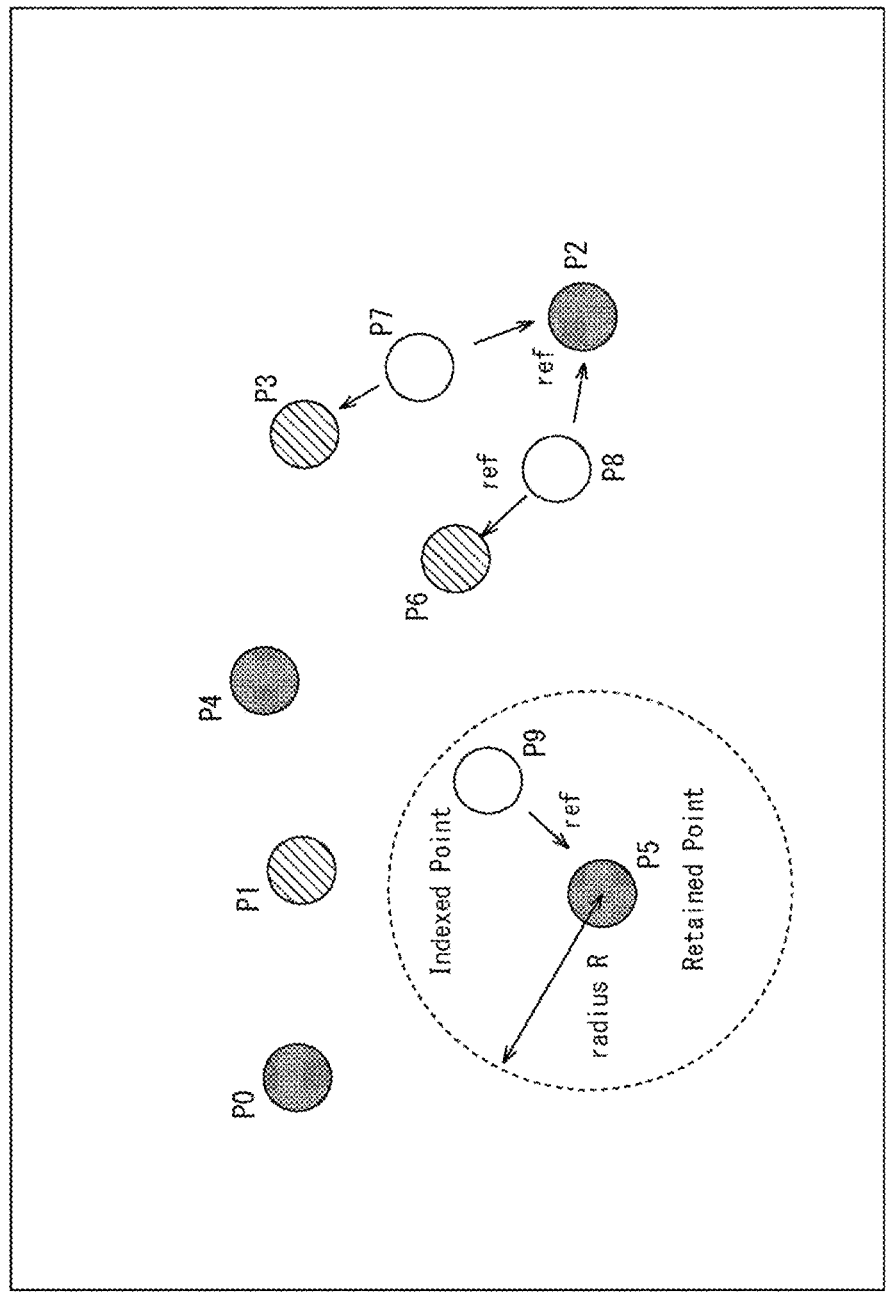
FIG. 1 is a diagram for describing an example of a state of lifting that does not cope with scalable decoding.

Hereinafter, modes for carrying out the present disclosure (hereinafter referred to as embodiments) will be described. The description will be made in the following order.
1. Switching of hierarchization/inverse hierarchization method
2. Control of reference relations
3. First embodiment (encoding device)
4. Second embodiment (decoding device)
5. Third embodiment (encoding device)
6. Fourth embodiment (decoding device)
7. Supplement 1. Switching of Hierarchization/Inverse Hierarchization Method Literature and the Like Supporting Technical Details and Technical Terms The scope disclosed in the present technology includes not only details described in embodiments but also details described in the following non patent literature known at the time of filing the application.
NPL 1: (Aforementioned)
NPL 2: (Aforementioned)
NPL 3: (Aforementioned)
NPL 4: TELECOMMUNICATION STANDARDIZATION SECTOR OF ITU (International Telecommunication Union), "Advanced video coding for generic audiovisual services", H.264, April 2017
NPL 5: TELECOMMUNICATION STANDARDIZATION SECTOR OF ITU (International Telecommunication Union), "High efficiency video coding", H.265, December 2016
NPL 6: Jianle Chen, Elena Alshina, Gary J. Sullivan, Jens-Rainer, Jill Boyce, "Algorithm Description of Joint Exploration Test Model 4", JVET-G1001_v1, Joint Video Exploration Team (JVET) of ITU-T SG 16 WP 3 and ISO/IEC JTC 1/SC 29/WG 11 7th Meeting: Torino, IT, 13-21 July 2017

That is, details described in the aforementioned non patent literature are also grounds for determination of support requirements. For example, even though Quad-Tree Block Structure described in NPL 5 and QTBT (Quad Tree Plus Binary Tree) Block Structure described in NPL 6 are not explicitly described in embodiments, they are assumed to be included in the scope of disclosure of the present technology and to satisfy support requirements of the claims. In addition, even though technical terms such as parsing, syntax, and semantics are not explicitly described in embodiments, they are assumed to be included in the scope of disclosure of the present technology and to satisfy support requirements of the claims.

Point Cloud

Conventionally, there are 3D data such as a point cloud representing a three-dimensional structure according to position information, attribute information, and the like of a point group, and a mesh composed of vertexes, edges, and surfaces and defining a three-dimensional shape using polygon representation.

For example, in the case of a point cloud, a three-dimensional structure (an object in a three-dimensional shape) may be represented as a set of a plurality of points (point group). That is, data of the point cloud (also referred to as point cloud data) is composed of geometry data (also referred to as position information) and attribute data (also referred to as attribute information) of each point of the point group. Attribute data can include arbitrary information. For example, color information, reflectance information, normal line information, and the like may be included in attribute data. Accordingly, a data structure is relatively simple and an arbitrary space structure can be represented with sufficient accuracy using a sufficiently large number of points.

Quantization of Position Information Using Voxels

Since the amount of such point cloud data is relatively large, an encoding method using voxels has been conceived in order to compress the amount of data according to encoding and the like. A voxel is a three-dimensional region for quantizing geometry data (position information).

That is, a three-dimensional region including a point cloud is split into small three-dimensional regions called voxels and whether each voxel includes a point is represented. By doing so, a position of each point is quantized in units of voxels. Accordingly, it is possible to curb increase in the amount of information (typically reduce the amount of information) by converting point cloud data into data of voxels (also referred to as voxel data).

Octree

Further, construction of an octree using such voxel data with respect to geometry data has been conceived. An octree is a tree structure in which voxel data is structurized. A value of each bit of the lowest node of this octree represents presence or absence of a point in each voxel. For example, a value "1" represents a voxel including a point and a value "0" represents a voxel not including a point. In an octree, 1 node corresponds to 8 voxels. That is, each node of an octree is composed of 8-bit data and 8 bits represent presence or absence of points in 8 voxels.

In addition, a higher node of an octree represents presence or absence of a point in a region in which 8 voxels corresponding to a lower node belonging to the higher node are combined into one. That is, a higher node is generated by combining information of voxels of a lower node. Meanwhile, in the case of a node having a value of "0", that is, when all 8 voxels corresponding thereto do not include a point, that node is deleted.

By doing so, an octree composed of nodes having values that are not "0" is constructed. That is, an octree can represent presence or absence of a point in a voxel of each resolution. According to structurization into an octree and encoding, position information may be decoded from the highest resolution (highest level) to a desired level (resolution) and thus point cloud data with that desired resolution can be reconstructed. That is, it is possible to easily decode information at an arbitrary resolution without decoding information of an unnecessary level (resolution). In other words, it is possible to realize scalability of voxels (resolution).

In addition, since the resolution of voxels in a region having no points can be reduced by omitting nodes having a value of "0", as described above, increase in the amount of information can be further curbed (typically the amount of information can be reduced).

Lifting

On the other hand, at the time of encoding attribute data (attribute information), encoding is performed using a positional relationship between points on the assumption that geometry data (position information) including deterioration according to encoding is known. As methods of encoding such attribute data, region adaptive hierarchical transform (RAHT) and a method using a transform called lifting as described in NPL 2 have been conceived. By applying these techniques, attribute data can be hierarchized like an octree of geometry data.

For example, in the case of lifting described in NPL 2, attribute data of each point is encoded as a difference value with respect to a predictive value derived using attribute data of another point. In that case, points are hierarchized and difference values are derived according to this hierarchical structure.

That is, with respect to attribute data for each point, points are classified as a predictive point or a reference point, a predictive value of attribute data of a predictive point is derived using attribute data of a reference point, and a difference value between the attribute data of the predictive point and the predictive value is derived. Such processing is recursively repeated for reference points to hierarchize attribute data of each point.

In the case of lifting described in NPL 2, such hierarchization is performed on the basis of a distance between points using geometry data. That is, a point positioned within a range a predetermined distance from a reference point is set as a predictive point for which a predictive value is derived with reference to the reference point. For example, it may be assumed that a point P5 is selected as a reference point in FIG. 1. In such a case, a predictive point is searched for within a circular region with a radius R having the point P5 at the center. In this case, a point P9 is positioned in the region and thus it is set as a predictive point for which a predictive value is derived with reference to the point P5 (a predictive point having the point P5 as a reference point).

According to such processing, for example, difference values of points P7 to P9 represented by a white circle, difference values of points P1, P3, and P6 represented by an oblique-line pattern, and difference values of points P0, P2, P4, and P5 represented by a gray circle are derived as difference values of different levels.

However, this hierarchical structure is generated independently of a hierarchical structure (e.g., octree) of geometry data and basically is not associated with the hierarchical structure of geometry data. To reconstruct point cloud data, it is necessary to associate geometry data with attribute data, and thus the geometry data and the attribute data need to be decoded to the highest resolution (i.e., lowest level).

Figure 2:
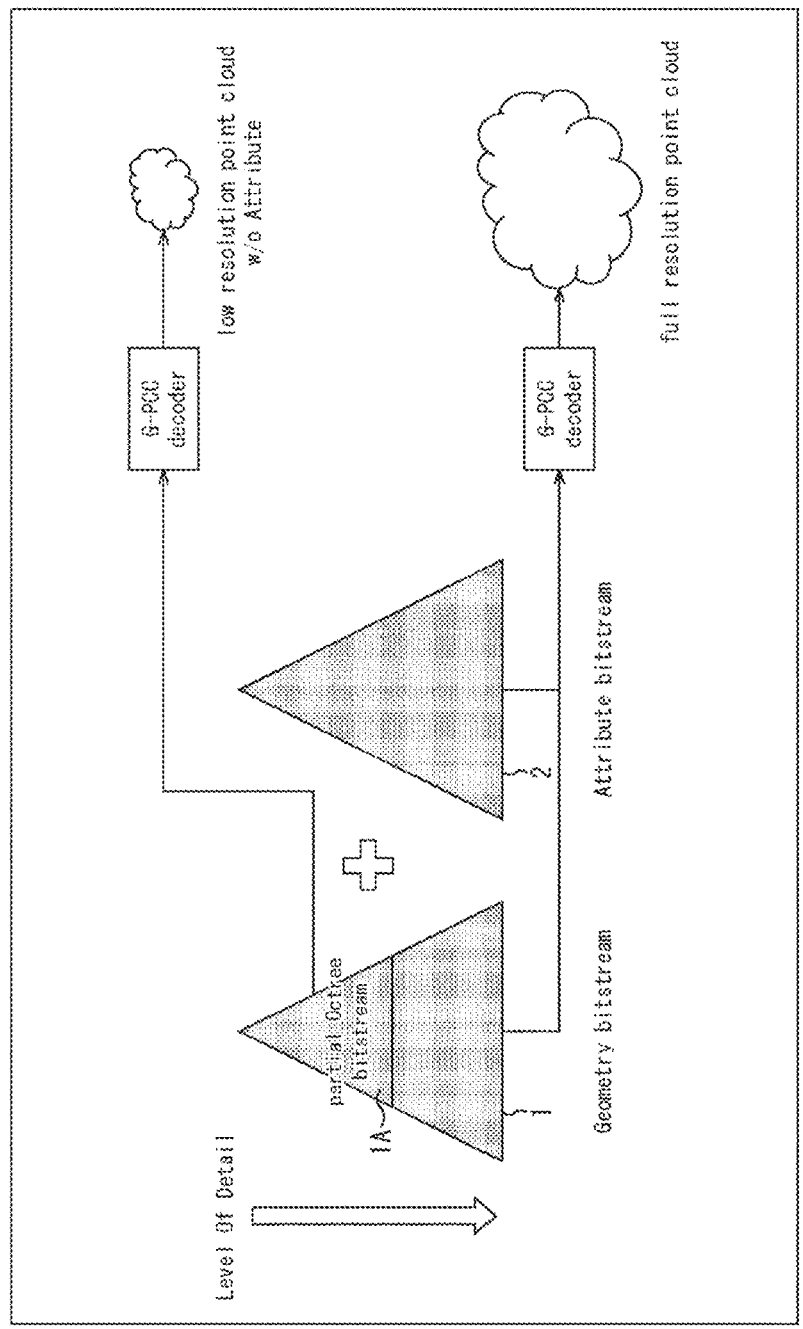
FIG. 2 is a diagram for describing an example of a state of lifting that does not cope with scalable decoding.

For example, when geometry data 1 is decoded at a certain resolution, as illustrated in FIG. 2, only a part of geometry data 1A may be decoded. However, to obtain attribute data at the same resolution, both the geometry data 1 and attribute data 2 need to be decoded to the highest resolution (i.e., lowest level). That is, a method employing lifting described in NPL 2 does not cope with resolution-scalable decoding.

Hierarchization Coping With Scalable Decoding

On the other hand, the hierarchization described in NPL 3 copes with resolution-scalable decoding. In the case of the method described in NPL 3, hierarchization of attribute data is performed such that a hierarchical structure of the attribute data is consistent with a hierarchical structure of an octree of geometry data. That is, when a point is present in a region corresponding to a voxel of geometry data (when attribute data corresponding to the point is present), a reference point and a predictive point are selected such that a point is also present in a voxel one level higher than the voxel (attribute data corresponding to the point is present). That is, attribute information is hierarchized according to a hierarchical structure of an octree of the geometry data.

Figure 3:
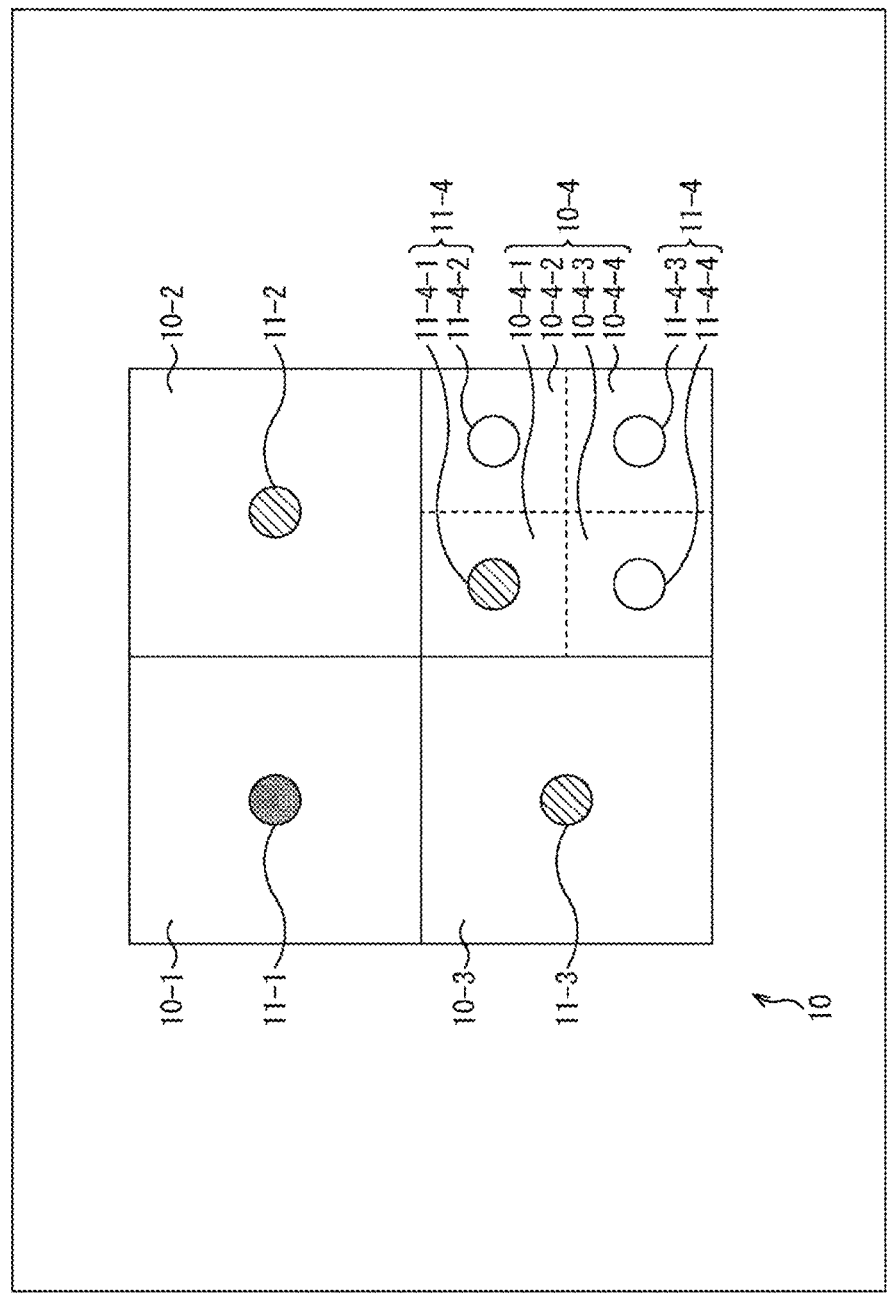
FIG. 3 is a diagram for describing an example of a state of lifting that copes with scalable decoding.

For example, when a two-dimensional hierarchical structure is described for simplification of description, voxels 10-1 to 10-4 are formed one level lower than a certain voxel 10, and voxels 10-4-1 to 10-4-4 are formed one level lower than the voxel 10-4 in FIG. 3. A point 11-1 of attribute data (which indicates attribute data corresponding to point 11-1, the same applies hereinafter) is present in the voxel 10-1. A point 11-2 of the attribute data is present in voxel data 10-2 and a point 11-3 of the attribute data is present in voxel data 10-3. Points 11-4-1 to 11-4-4 of the attribute data are present in the voxels 10-4-1 to 10-4-4.

In this case, with respect to the voxels 10-4-1 to 10-4-4, for example, the point 11-4-1 is set as a reference point and the points 11-4-2 to 11-4-4 are set as predictive points such that one point (attribute data) remains in the voxel 10-4 one level higher than the voxels 10-4-1 to 10-4-4.

Likewise, with respect to the voxels 10-1 to 10-4, for example, the point 11-1 is set as a reference point and the points 11-2, 11-3, and 11-4-1 are set as predictive points such that one point remains in the voxel 10 one level higher than the voxels 10-1 to 10-4.

In such a manner, the same hierarchization as that of geometry data can also be realized with respect to attribute data. In addition, a hierarchical structure of attribute data can be associated with a hierarchical structure of geometry data to cope with scalable decoding.

Figure 4:
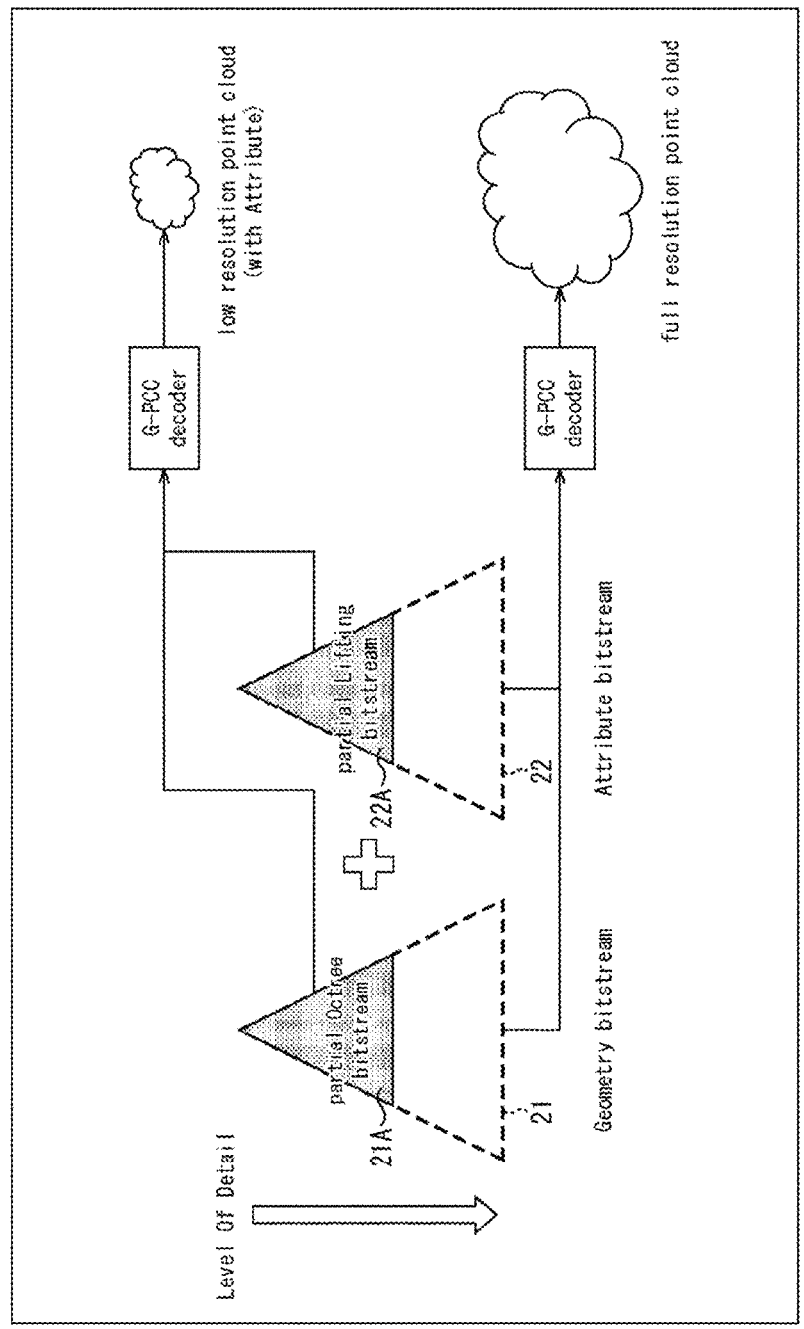
FIG. 4 is a diagram for describing an example of a state of lifting that copes with scalable decoding.

For example, when geometry data 21 is decoded at a certain resolution, as illustrated in FIG. 4, only a part of geometry data 21A may be decoded. In this case, since hierarchical structures are associated with each other in the geometry data 21 and attribute data 22, only a part of attribute data 22A corresponding to the geometry data 21A can also be decoded in the attribute data 22.

That is, it is possible to easily reconstruct point cloud data at a desired resolution without performing decoding to the lowest level. In this manner, the method using the technique described in NPL 3 copes with resolution-scalable decoding.

However, this method may reduce the encoding efficiency to lower than that of the method described in NPL 2. Particularly, when points are in a sparse state, the reduction in encoding efficiency may be greater.

Switching of Hierarchization Method in Hierarchization

Accordingly, in hierarchization of attribute data, a hierarchization method for the attribute data may be switched at a middle level as described in "method 1" in the top row of a table shown in FIG. 5.

For example, with respect to attribute information for each point of a point cloud representing an object in a three-dimensional shape as a set of points, a plurality of hierarchization methods are used to generate different levels at the time of hierarchizing attribute information by recursively repeating processing of classifying points as a predictive point or a reference point, deriving a predictive value of attribute information of predictive points using attribute information of reference points, and deriving difference values between the attribute information of the predictive points and the predictive values for the reference points.

For example, an information processing device may include a hierarchization unit that recursively repeats, with respect to attribute information for each point of a point cloud representing an object in a three-dimensional shape as a set of points, processing of classifying points as a predictive point or reference points, deriving predictive values of attribute information of predictive points using attribute information of reference points, and deriving difference values between the attribute information of the predictive points and the predictive values, for the reference points, to perform hierarchization of the attribute information, wherein the hierarchization unit may perform hierarchization using a plurality of hierarchization methods and generate different levels according to the hierarchization methods. In other words, an information processing device that processes attribute information of respective points of a point cloud representing an object in a three-dimensional shape as a set of points may include a hierarchization unit that recursively repeats processing of deriving difference values between predictive values of attribute information of predictive points, derived using attribute information of reference points among points classified as a predictive point or a reference point, and the attribute information of the predictive points for the reference points to perform hierarchization of the attribute information, wherein the hierarchization unit may perform hierarchization of a first level using a first hierarchization method and perform hierarchization of a second level different from the first level using a second hierarchization method different from the first hierarchization method.

By doing so, a hierarchical structure can be formed using a plurality of hierarchization methods, and thus a method suitable for characteristics of each level can be selected. Accordingly, hierarchization can be performed on more varied types of attribute data through a more suitable method to curb reduction in encoding efficiency.

Meanwhile, the number of times of switching a hierarchization method is arbitrary and may be one time or multiple times. In addition, the number of applied hierarchization methods may be any plural number, for example, 3 or more. Further, the same hierarchization method may be applied multiple times. For example, hierarchization methods may be switched between in order of hierarchization method A, hierarchization method B, and hierarchization method A at the middle level.

In addition, when hierarchization methods are switched between in this manner, for example, a method that copes with scalable decoding and a method that does not cope with scalable decoding may be switched between as described in "method 1-1" in the second row of the table shown in FIG. 5. In other words, some levels of a hierarchical structure of attribute data may be hierarchized according to a method that copes with scalable decoding.

For example, the hierarchization method (method that copes with scalable decoding) described in NPL 3 and lifting (method that does not cope with scalable decoding) described in NPL 2 may be switched at a middle level of a hierarchical structure. That is, the hierarchization method described in NPL 3 may be applied to only some levels of a hierarchical structure of attribute data.

By doing so, only a level that is highly likely to be scalably decoded can be generated using the hierarchization method described in NPL 3 and other levels can be generated using lifting described in NPL 2. Accordingly, reduction in encoding efficiency can be curbed compared with in a case in which all levels are generated using the hierarchization method described in NPL 3. In other words, it is possible to cope with scalable decoding while curbing reduction in encoding efficiency.

In that case, a level higher than a predetermined level may be hierarchized according to a method that does not cope with scalable decoding and the predetermined level and lower levels may be hierarchized according to a method that copes with scalable decoding, for example, as described in "method 1-1-1" in the third row of the table shown in FIG. 5. For example, a level higher than a predetermined level including a first level may be generated according to a first hierarchization method that does not cope with scalable decoding and a level lower than a predetermined level including a second level may be generated according to a second hierarchization method that copes with scalable decoding.

In that case, lifting that does not cope with scalable decoding (method described in NPL 2) and lifting that copes with scalable decoding (method described in NPL 3) may be switched, for example, as described in "method 1-1-1-1" in the fourth row of the table shown in FIG. 5.

For example, a level higher than a predetermined level may be hierarchized according to lifting described in NPL 2 and the predetermined level and lower levels may be hierarchized according to the hierarchization method described in NPL 3 (lifting that copes with scalable decoding).

When a method that copes with scalable decoding is applied to a higher level at which points are likely to be in a sparse state, the encoding efficiency is likely to be reduced. In addition, resolution considerably decreases at a level near the highest level, and thus decoding is less likely to be performed at that level. That is, scalable decoding is less likely to be performed at a higher level.

Accordingly, it is possible to curb reduction in encoding efficiency while curbing substantial restriction on scalable decoding by applying a method that does not cope with scalable decoding at levels higher than a predetermined level in a hierarchical structure of attribute data, as described above. In other words, it is possible to cope with scalable decoding while curbing reduction in encoding efficiency.

Figure 6:
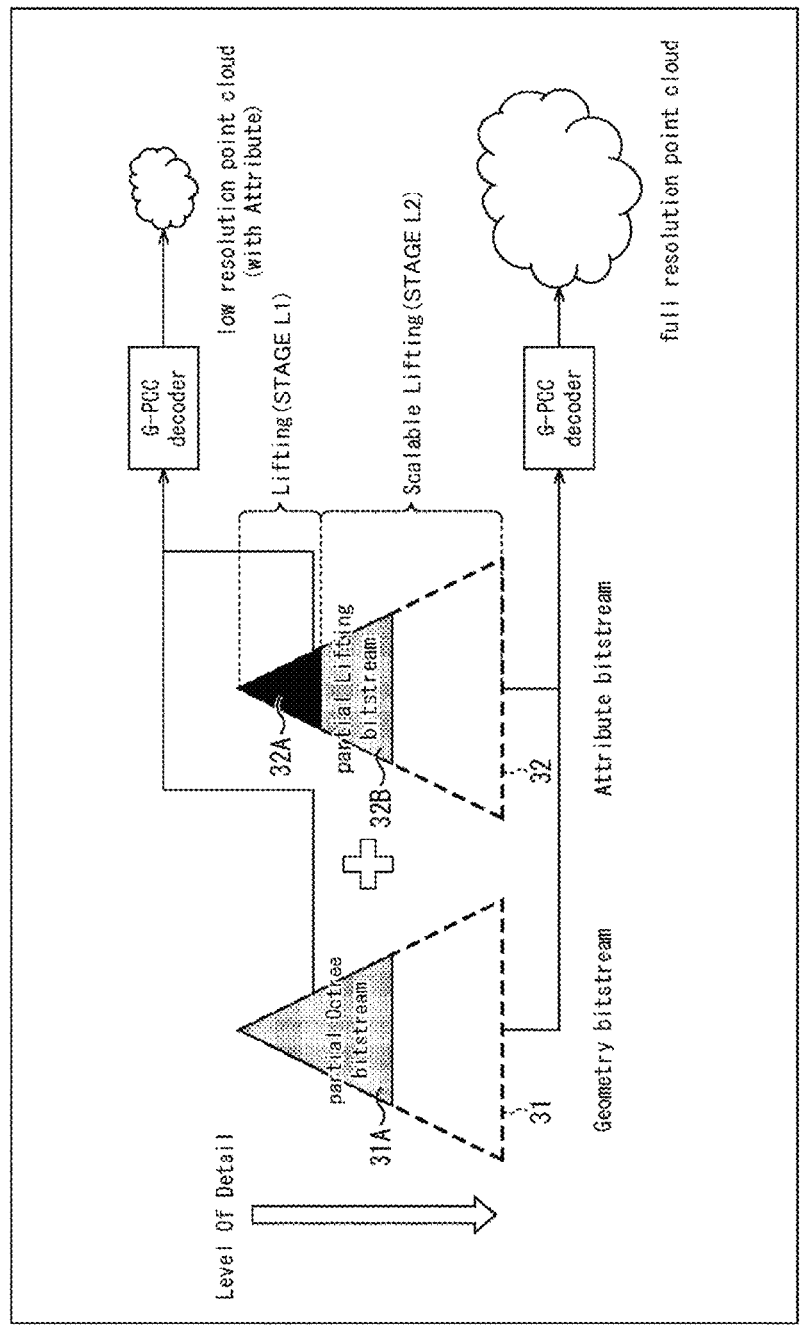
FIG. 6 is a diagram for describing an example of a state when both a lifting method that copes with scalable decoding and a lifting method that does not cope with scalable decoding are applied.

In this case, when geometry data 31 is decoded at a certain resolution, as illustrated in FIG. 6, only a part of geometry data 31A may be decoded. In this case, since hierarchical structures correspond to each other in the geometry data 31 and attribute data 32, also only parts of attribute data 32A and attribute data 32B corresponding to the geometry data 31A in the attribute data 32 can be decoded.

That is, it is possible to easily reconstruct point cloud data at a desired resolution without performing decoding to the lowest level. However, in this case, the attribute data 32A is data hierarchized according to lifting that does not cope with scalable decoding. That is, in this case, a higher level (stage L1) of the attribute data 32 is hierarchized according to lifting that does not cope with scalable decoding and a level (stage L2) lower than the higher level is hierarchized according to lifting that copes with scalable decoding. Accordingly, scalable decoding cannot be performed on 0-th to (L1-1)-th stages from the top (both the geometry data 31 and the attribute data 32 need to be decoded to the stage L1). However, since such a higher level has low resolution, scalable decoding is less likely to be performed thereon and thus it is possible to curb reduction in encoding efficiency while curbing substantial restriction on scalable decoding, as described above.

Other Examples of Switching Methods

Meanwhile, a level at which hierarchization methods are switched is arbitrary. In addition, switched hierarchization methods may be any methods and are not limited to the above-described examples (switching between a method that copes with scalable decoding and a method that does not cope with scalable decoding). For example, a hierarchization method using sampling according to a distance, such as lifting described in NPL 2, and a method of hierarchizing points by arranging respective points (attribute data corresponding to respective points) in Morton order and sampling the points at equal intervals may be switched, as described in "method 1-2" in the fifth row of the table shown in FIG. 5.

For example, a hierarchization method using sampling according to a distance may be applied to levels higher than a predetermined level and a hierarchization method using equal-interval sampling in Morton order may be applied to the predetermined level and lower levels. By doing so, it is possible to curb reduction in encoding efficiency as in the above-described examples.

Processing Order

In hierarchization, a level processing order (generation order) is arbitrary. For example, hierarchization may be sequentially performed from the lowest level as described in "method 1-3" in the sixth row of the table shown in FIG. 5. For example, levels are generated one by one, and after all levels are generated, the levels are reversed. For example, level numbers may be assigned in a reverse order to that of the generation order. By doing so, levels can be generated from the lowest level toward the highest level.

According to hierarchization, each point is classified as a reference point or a predictive point, and the reference point is processed again as a point of a higher level. That is, a reference relation between levels is constructed according to hierarchization. The aforementioned recursive processing can be performed by sequentially generating levels from the lowest level, as described above, and thus a reference relation between levels can be constructed more easily.

Control Information

For example, control information about hierarchization of attribute information may be signaled (transmitted from an encoding side to a decoding side) as described in "method 1-4" in the seventh row of the table shown in FIG. 5.

A transmission method for the control information is arbitrary. For example, the control information may be defined by a syntax or the like, included in encoded data (bitstream) of point cloud data (for example, written in a header or the like), and transmitted. In addition, the control information may be transmitted as data associated with encoded data of point cloud data, different from the encoded data of the point cloud data.

Scalable_Enable_Flag

The content of control information is arbitrary. For example, when a method that copes with scalable decoding and a method that does not cope with scalable decoding can be switched between at a middle level, control information representing whether the hierarchization method that copes with scalable decoding is applicable may be transmitted to a decoding side. In such a case, this control information may represent whether the hierarchization method that copes with scalable decoding is applicable in any manner.

For example, scalable_enable_flag may be transmitted as flag information. scalable_enable_flag is flag information representing whether a hierarchization method that copes with scalable decoding is applicable. This flag information represents that a hierarchization method that copes with scalable decoding is applicable when the value thereof is true (e.g., "1") and represents that the hierarchization method that copes with scalable decoding is not applicable when the value thereof is false (e.g., "0"). For example, a case in which scalable_enable_flag is omitted may be assumed to be equivalent to a case in which the value of this flag information is false (e.g., "0").

In addition, a data unit for transmission of this control information (scalable_enable_flag) is arbitrary. For example, scalable_enable_flag may be transmitted for each sequence of point cloud data. Further, for example, scalable_enable_flag may be transmitted for each piece of attribute data. For example, when a plurality of pieces of attribute data are present for geometry data, it is possible to represent whether a hierarchization method that copes with scalable decoding is applicable for each piece of attribute data by transmitting scalable_enable_flag for each piece of attribute data. That is, it is possible to adapt only some attribute data to scalable decoding, for example. It goes without saying that scalable_enable_flag may be transmitted for each data unit other than these examples.

By transmitting control information in this manner, a decoding side can identify whether to perform inverse hierarchization corresponding to a hierarchization method adapted to scalable decoding on the basis of this control information. Accordingly, the identification can be performed more easily. Thereby, it is possible to curb increase in decoding processing load.

For example, a hierarchization method adapted to scalable decoding is not applied to attribute data with scalable_enable_flag that is false, and thus processing with respect to scalable decoding is unnecessary. Accordingly, a decoding device can omit all processing with respect to scalable decoding on the basis of the fact that scalable_enable_flag is false. For example, it is also possible to omit reference to control information representing a range of levels to which a hierarchization method adapted to scalable decoding is applied, which will be described later. In addition, it is also possible to omit determining of whether to use a hierarchization method adapted to scalable decoding at the time of inverse hierarchization. In this manner, increase in decoding processing load can be curbed.

Scalable_Enable_Num_Of_Lod

Furthermore, control information representing a range of levels to which a hierarchization method adapted to scalable decoding may be applied may be transmitted to a decoding side, for example. In such a case, this control information may represent a range of levels to which a hierarchization method adapted to scalable decoding may be applied in any manner. For example, the control information may represent the range, represent a level at which hierarchization methods are switched between (a level that is a boundary of the range), or represent a range of levels to which a hierarchization method adapted to scalable decoding is not applied.

For example, when the control information represents a range of levels to which a hierarchization method adapted to scalable decoding may be applied, the control information may represent the upper limit and the lower limit of the range or represent the range by the size (the number of levels) of the range and a level number (an identification number increasing by 1 for each one level of decrease from the highest level 0) of a reference position (e.g., a start position, a middle position, an end position, or the like) of the range. In addition, when the lower limit is equal to the lowest level or the upper limit is equal to the highest level, the range may be represented by the number of levels from the lower limit (lowest level) or the upper limit (highest level).

For example, a syntax element scalable_enable_num_of_lod may be transmitted. scalable_enable_num_of_lod is control information representing a range of levels to which a hierarchization method adapted to scalable decoding may be applied. The value thereof represents the range of levels to which a hierarchization method adapted to scalable decoding may be applied by the number of levels from the lowest level. That is, when scalable_enable_num_of_lod=N, encoded data of attribute data from the lowest level to the level of an N-th stage is adapted to scalable decoding, and levels of an (N+1)-th stage and higher are not adapted to scalable decoding.

By transmitting such control information, a decoding side can easily and accurately ascertain a level to which a hierarchization method adapted to scalable decoding may be applied on the basis of the control information. Accordingly, it is possible to correctly decode encoded data to which a plurality of hierarchization methods have been applied. Therefore, it is possible to curb reduction in encoding efficiency.

Others

Meanwhile, control information is not limited to the above-described examples, and any information may be transmitted. In addition, the number of pieces of transmitted control information is arbitrary and a plurality of pieces of control information may be transmitted. For example, the aforementioned scalable_enable_flag and scalable_enable_num_of_lod may be transmitted. scalable_enable_num_of_lod may be transmitted only when scalable_enable_flag is true.

In any case, scalable_enable_num_of_lod is referred to and a level to which a hierarchization method adapted to scalable decoding is applied is identified in a decoding side only when scalable_enable_flag is true.

Switching Between Hierarchization Methods in Inverse Hierarchization

Although processing in encoding has been described above, the present technology can be applied to a decoding side. For example, attribute information hierarchization methods may be switched between at a middle level in inverse hierarchization (i.e., inverse hierarchization methods are switched between) as described in "method 2" in the eighth row of the table shown in FIG. 5.

For example, with respect to attribute information for each point of a point cloud representing an object in a three-dimensional shape as a set of points, inverse hierarchization is performed on different levels using a plurality of hierarchization methods at the time of performing inverse hierarchization on attribute information hierarchized by recursively repeating processing of classifying points as a predictive point or a reference point, deriving predictive values of attribute information of predictive points using attribute information of reference points, and deriving difference values between the attribute information of the predictive points and the predictive values for the reference points.

For example, an information processing device may include an inverse hierarchization unit that performs inverse hierarchization on attribute information hierarchized by recursively repeating, with respect to attribute information for each point of a point cloud representing an object in a three-dimensional shape as a set of points, processing of classifying points as a predictive point or a reference point, deriving predictive values of attribute information of predictive points using attribute information of reference points, and deriving difference values between the attribute information of the predictive points and the predictive values, for the reference points, wherein the inverse hierarchization unit may perform inverse hierarchization on different levels using a plurality of hierarchization methods. In other words, an information processing device that processes attribute information of respective points of a point cloud representing an object in a three-dimensional shape as a set of points may include an inverse hierarchization unit that performs inverse hierarchization on attribute information hierarchized by recursively repeating processing of deriving difference values between predictive values of attribute information of predictive points, derived using attribute information of reference points among points classified as a predictive point or a reference point, and the attribute information of the predictive points for the reference points, wherein the inverse hierarchization unit may perform inverse hierarchization of a first level using a first hierarchization method and perform hierarchization of a second level different from the first level using a second hierarchization method different from the first hierarchization method.

By doing so, inverse hierarchization can be performed using a plurality of hierarchization methods, and thus attribute data hierarchized using a plurality of hierarchization methods can be appropriately inversely hierarchized. That is, encoded data that has been encoded using a plurality of hierarchization methods can be correctly decoded. Accordingly, it is possible to curb reduction in encoding efficiency.

Meanwhile, the number of times of switching a hierarchization method is arbitrary and may be one time or multiple times. In addition, the number of applied hierarchization methods may be any plural number, for example, 3 or more. Further, the same hierarchization method may be applied multiple times. For example, hierarchization methods may be switched between in order of hierarchization method A, hierarchization method B, and hierarchization method A at the middle level.

In addition, as in the case of hierarchization, a method adapted to scalable decoding and a method that is not adapted to scalable decoding may be switched between, for example, as described in "method 2-1" in the ninth row of the table shown in FIG. 5. In other words, some levels of a hierarchical structure of attribute data may be inversely hierarchized according to a method adapted to scalable decoding.

For example, the hierarchization method (method that copes with scalable decoding) described in NPL 3 and lifting (method that does not cope with scalable decoding) described in NPL 2 may be switched between at a middle level of a hierarchical structure. That is, the hierarchization method described in NPL 3 may be applied to only inverse hierarchization for some levels of a hierarchical structure of attribute data.

By doing so, it is possible to cope with scalable decoding while curbing reduction in encoding efficiency.

In that case, a level higher than a predetermined level may be inversely hierarchized according to a method that is not adapted to scalable decoding and the predetermined level and lower levels may be inversely hierarchized according to a method adapted to scalable decoding, for example, as described in "method 2-1-1" in the tenth row of the table shown in FIG. 5. For example, inverse hierarchization may be performed on a level higher than a predetermined level including a first level according to a first hierarchization method that is not adapted to scalable decoding, and inverse hierarchization may be performed on a level lower than a predetermined level including a second level according to a second hierarchization method adapted to scalable decoding.

In that case, lifting that is not adapted to scalable decoding (method described in NPL 2) and lifting adapted to scalable decoding (method described in NPL 3) may be switched between, for example, as described in "method 2-1-1" in the eleventh row of the table shown in FIG. 5.

For example, inverse hierarchization may be performed on a level higher than a predetermined level according to lifting described in NPL 2 and inverse hierarchization may be performed on the predetermined level and lower levels according to the hierarchization method described in NPL 3 (lifting adapted to scalable decoding).

By doing so, it is possible to curb reduction in encoding efficiency while curbing substantial restriction on scalable decoding. In other words, it is possible to adapt to scalable decoding while curbing reduction in encoding efficiency.

Other Examples of Switching Methods

Meanwhile, a level at which hierarchization methods are switched is arbitrary. In addition, switched hierarchization methods may be any methods and are not limited to the above-described examples (switching between a method that copes with scalable decoding and a method that does not cope with scalable decoding). For example, a hierarchization method using sampling according to a distance, such as lifting described in NPL 2, and a method of hierarchizing points by arranging respective points (attribute data corresponding to respective points) in Morton order and sampling the points at equal intervals may be switched between, as described in "method 2-2" in the twelfth row of the table shown in FIG. 5.

For example, a hierarchization method using sampling according to a distance may be applied to inverse hierarchization of a level higher than a predetermined level and a hierarchization method using equal-interval sampling in Morton order may be applied to inverse hierarchization of the predetermined level and lower levels. By doing so, it is possible to curb reduction in encoding efficiency as in the above-described examples.

Control Information

For example, inverse hierarchization may be performed (inverse hierarchization methods are switched between) on the basis of attribute data signaled (transmitted from an encoding side to a decoding side) as described in "method 2-3" in the thirteenth row of the table shown in FIG. 5.

The content of this control information is arbitrary. For example, the control information may be the aforementioned scalable_enable_flag. In addition, the control information may be, for example, the aforementioned scalable_enable_num_of_lod. Further, both of them is possible. For example, when scalable_enable_flag represents that a hierarchization method adapted to scalable decoding is applicable, a level at which inverse hierarchization methods are switched between may be identified on the basis of scalable_enable_num_of_lod with respect to that attribute data.

It goes without saying that examples other than these examples are possible. By using such control information, hierarchization methods can be switched between as in encoding. Accordingly, it is possible to correctly decode encoded data to which a plurality of hierarchization methods have been applied. Therefore, it is possible to curb reduction in encoding efficiency.

2. Control of Reference Relations

Hierarchical Structure of Attribute Data

However, since attribute data is hierarchized by classifying points thereof as a reference point or a predictive point, nodes may not be formed at the lowest level when points are sparse.

Figure 7:
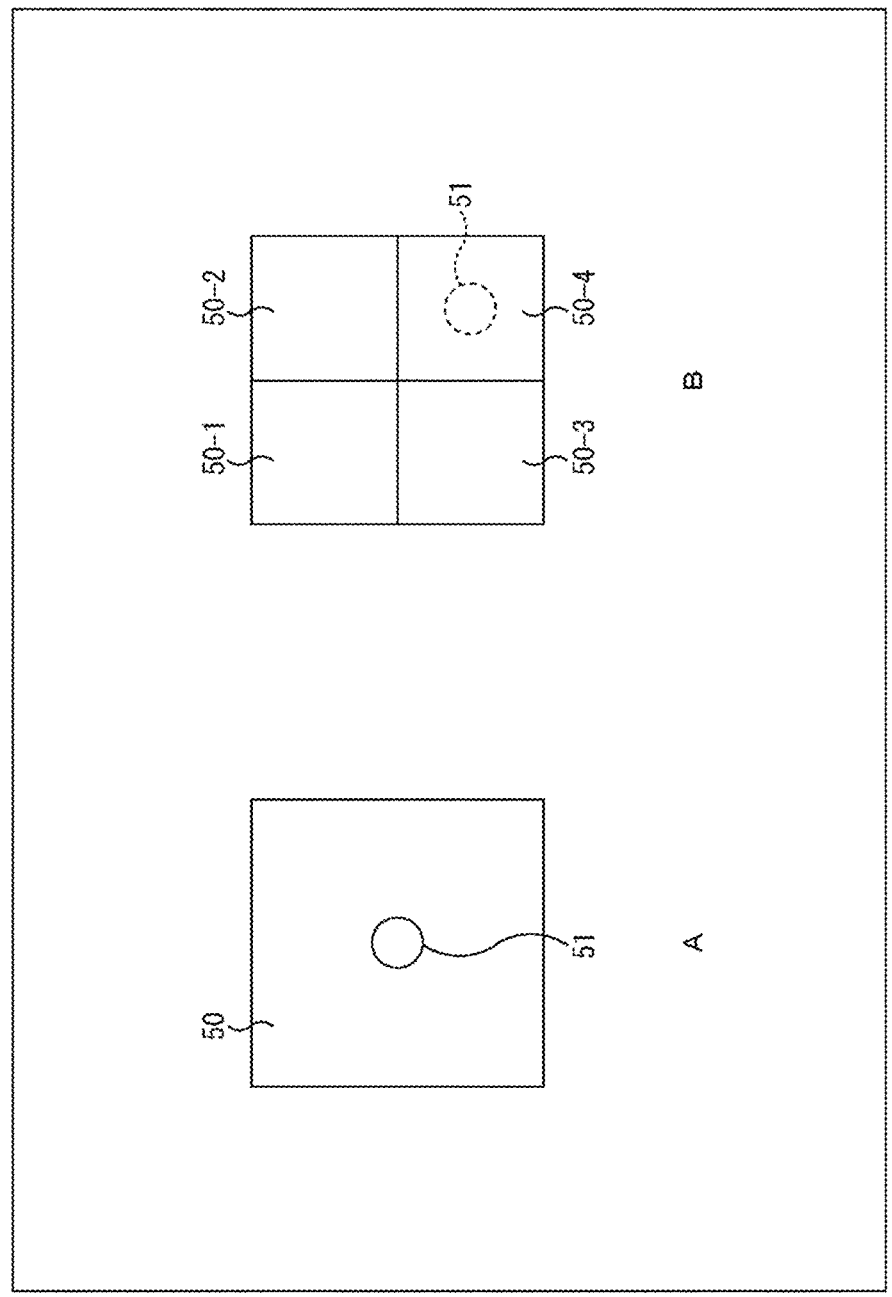
FIG. 7 is a diagram for describing lifting that copes with scalable decoding.

For example, in a region of a voxel 50 illustrated in A of FIG. 7, voxels 50-1 to voxel 50-4 are formed at a level lower than the voxel 50 by one, as illustrated in B of FIG. 7.

In the case of hierarchization of geometry data, a node is generated corresponding to a unique point 51 present in the voxel 50, as illustrated in A of FIG. 7, even at a level lower than the voxel 50. For example, a node of the point 51 is formed in the voxel 50-4 in B of FIG. 7. However, in the case of attribute data, when the unique point 51 is allocated to the level of the voxel 50, a node cannot be allocated to a voxel lower than the voxel 50.

Figure 8:
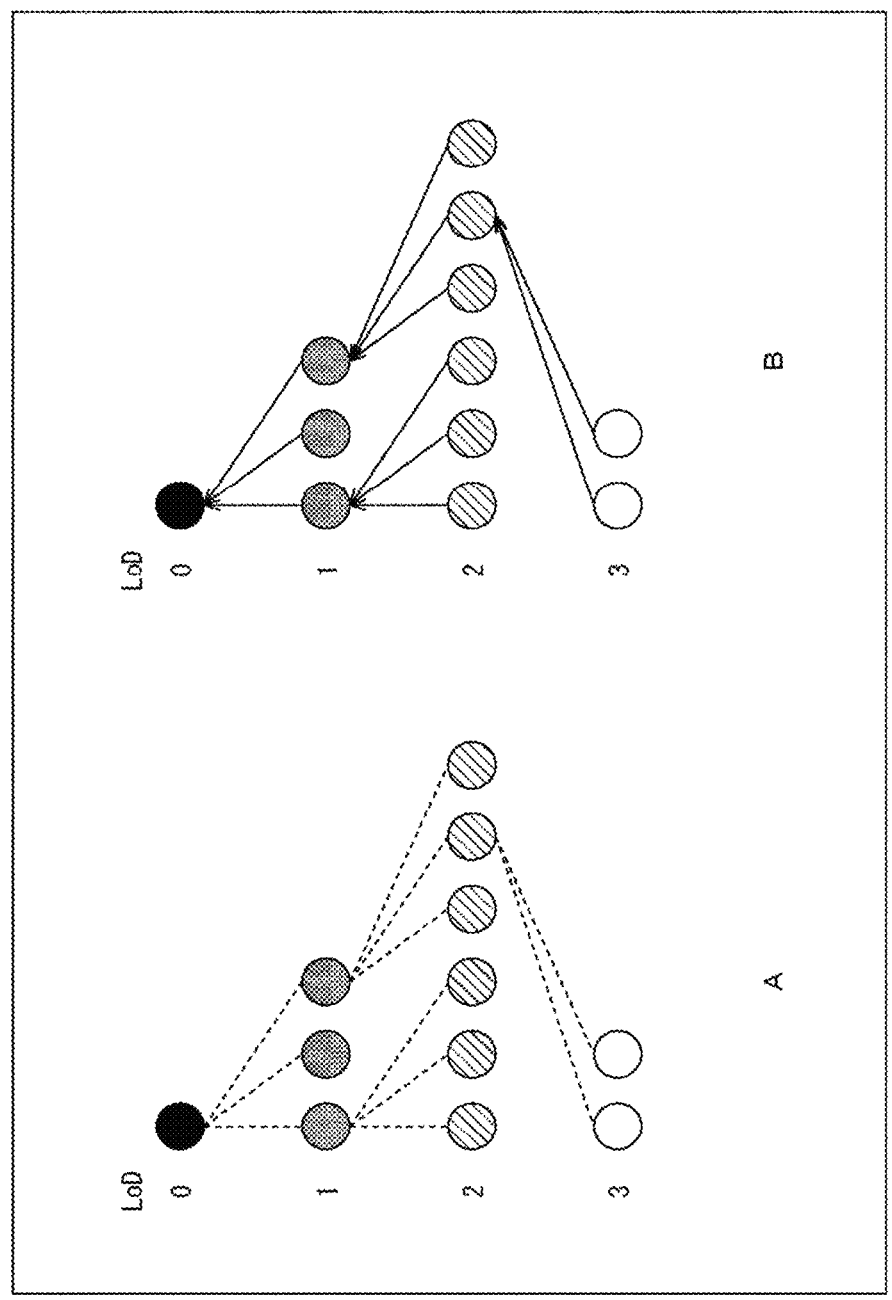
FIG. 8 is a diagram illustrating reference relationships.

Accordingly, in the case of attribute data, points of a certain level may be fewer than points of a level higher than the certain level. For example, an example of a hierarchical structure of attribute data is illustrated in A of FIG. 8. An example of four levels of level of detail (LoD)=0 to LoD=3 is illustrated in A of FIG. 8. A circle at each level represents a point. In the case of this example, the number of points of LoD=2 is 6, whereas the number of points of LoD=3 lower than LoD=2 is 2. In this case, reference relations are formed according to this hierarchical structure and thus is configured as indicated by arrows in B of FIG. 8.

The number of levels and a level width (the number of points of each level) have optimal values depending on data. However, a configuration in which the number of points monotonically increases from a higher level to a lower level has the highest encoding efficiency, in general. The encoding efficiency may be reduced in a configuration in which the number of points at a lower level is less than that at a higher level, as in the example of FIG. 8.

Merge of Nodes of Multiple Levels

Accordingly, reference relations may be constructed by merging points (nodes) of a plurality of levels.

For example, with respect to attribute information for each point of a point cloud representing an object in a three-dimensional shape as a set of points, derivation of predictive values of predictive points of a plurality of levels is performed with reference to reference points of the same levels at the time of hierarchizing attribute information by recursively repeating processing of classifying points as a predictive point or a reference point, deriving predictive values of attribute information of predictive points using attribute information of reference points, and deriving difference values between the attribute information of the predictive points and the predictive values for the reference points.

For example, an information processing device may include a hierarchization unit that recursively repeats, with respect to attribute information for each point of a point cloud representing an object in a three-dimensional shape as a set of points, processing of classifying points as a predictive point or a reference point, deriving predictive values of attribute information of predictive points using attribute information of reference points, and deriving difference values between the attribute information of the predictive points and the predictive values, for the reference points, to perform hierarchization of the attribute information, wherein the hierarchization unit may perform derivation of predictive values of predictive points of a plurality of levels with reference to reference points of the same levels. In other words, an information processing device that processes attribute information of respective points of a point cloud representing an object in a three-dimensional shape as a set of points may include a hierarchization unit that recursively repeats processing of deriving difference values between predictive values of attribute information of predictive points, derived using attribute information of reference points among points classified as a predictive point or a reference point, and the attribute information of the predictive points for the reference points to perform hierarchization of the attribute information, wherein the hierarchization unit may perform derivation of predictive values of predictive points of the plurality of levels with reference to reference points of the same levels.

By doing so, reference relations in a configuration in which the number of points monotonically increases from a higher level to a lower level can be constructed, and thus reduction in encoding efficiency can be curbed.

Figure 10:
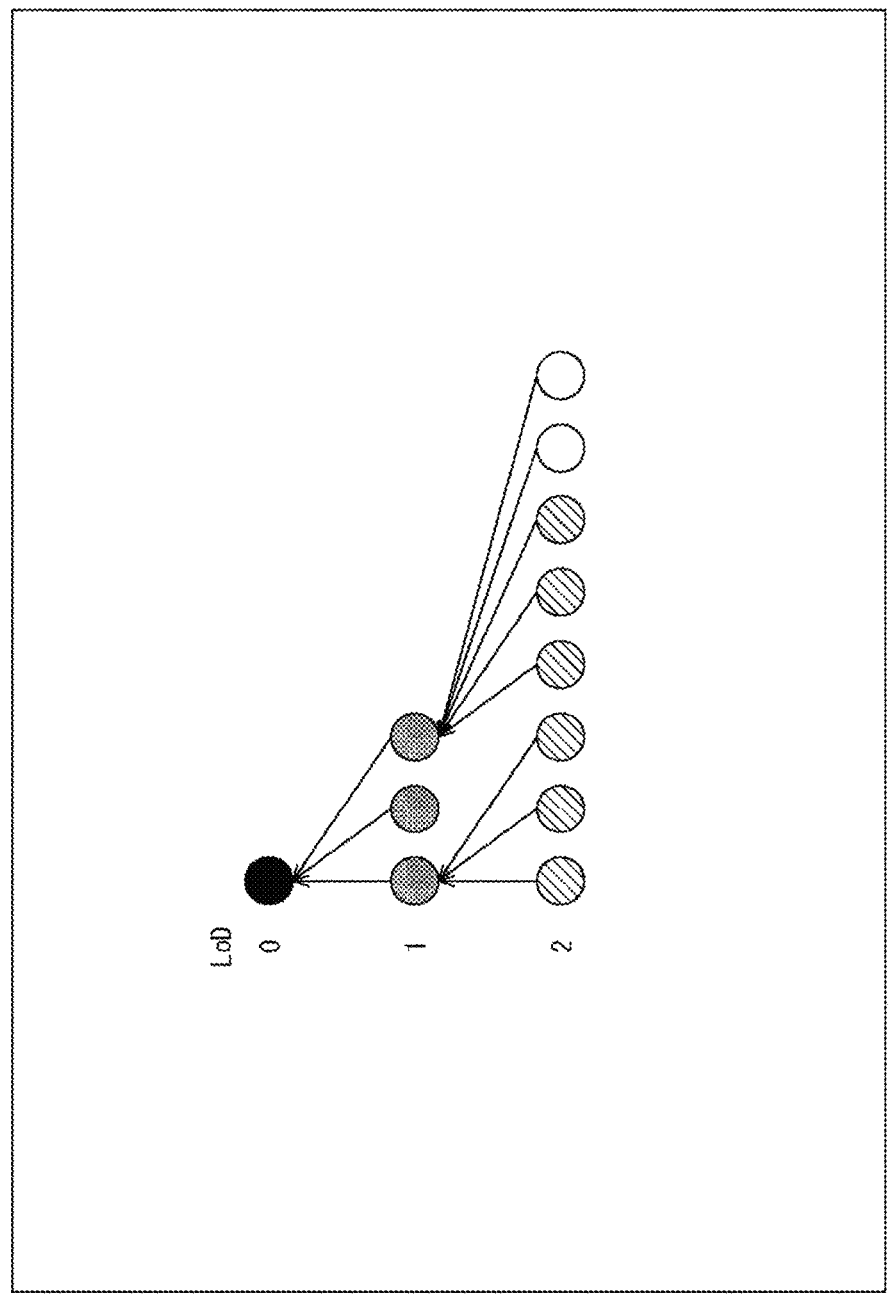
FIG. 10 is a diagram illustrating reference relationships.

For example, nodes (points) of a processing target level are merged into nodes (points) of a level higher by one level to construct reference relations in a hierarchical structure of attribute information, as described in "method 3" in the top row of a table shown in FIG. 9. In attribute data having a hierarchical structure as illustrated in A of FIG. 8, for example, the points of the level of LoD=3 are merged with the points of the level of LoD=2, which is a level immediately above, to construct reference relations. By doing so, it is possible to construct reference relationships in a configuration in which the number of points monotonically increases from a higher level to a lower level as illustrated in FIG. 10.

Furthermore, when the number of nodes of a processing target level is greater than the number of nodes of a level higher by one level, the aforementioned processing may be performed, for example, as described in "method 3-1" in the second low of the table shown in FIG. 9. That is, when the number of nodes of a processing target level is greater than the number of nodes of a level higher by one level, reference relations are constructed such that the nodes of the processing target level refer to the nodes of the level higher by one level. By doing so, it is possible to more easily construct reference relationships in a configuration in which the number of points monotonically increases from a higher level to a lower level.

Control Information

For example, control information about construction of reference relations may be signaled (transmitted from an encoding side to a decoding side), as described in "method 3-2" in the third row of the table shown in FIG. 9.

A transmission method for the control information is arbitrary. For example, the control information may be defined by a syntax or the like, included in encoded data (bitstream) of point cloud data (for example, described in a header or the like), and transmitted. In addition, the control information may be transmitted as data associated with encoded data of point cloud data, different from the encoded data of the point cloud data.

Merge_Lower_Lod_Flag

The content of control information is arbitrary. For example, control information representing whether reference relations are constructed according to merging with another level may be transmitted to a decoding side. In such a case, the control information may represent whether reference relations are constructed according to merging with another level in any manner.

For example, merge_lower_lod_flag may be transmitted as flag information. merge_lower_lod_flag is flag information representing whether reference relations are constructed according to merging with a level higher by one level. merge_lower_lod_flag represents that reference relations are constructed according to merging with a level higher by one level when the value thereof is true (e.g., "1") and represents that reference relations are constructed without merging with a level higher by one level (just referring to a level higher by one level as usual) when the value thereof is false (e.g., "0") for points (nodes) of the level. For example, a case in which merge_lower_lod_flag is omitted may be assumed to be equivalent to a case in which the value of this flag information is false (e.g., "0").

Meanwhile, this control information (merge_lower_lod_flag) is set for each level (level of detail (LoD)).

Inverse Hierarchization

Although processing in encoding has been described above, the present technology can be applied to a decoding side. For example, in inverse hierarchization, predictive points of a plurality of levels may be reconstructed with reference to reference points of the same levels based on construction of reference relations according to merging of points (nodes) of a plurality of levels.

For example, with respect to attribute information for each point of a point cloud representing an object in a three-dimensional shape as a set of points, predictive values of attribute information of predictive points of a plurality of levels are derived with reference to attribute information of reference points of the same levels and the derived predictive values are added to difference values to generate attribute information of the predictive points at the time of performing inverse hierarchization on attribute information hierarchized by recursively repeating processing of classifying points as a predictive point or a reference point, deriving predictive values of attribute information of predictive points using attribute information of the reference points, and deriving difference values between the attribute information of the predictive points and the predictive values for the reference points.

For example, an information processing device may include an inverse hierarchization unit that performs inverse hierarchization on attribute information hierarchized by recursively repeating, with respect to attribute information for each point of a point cloud representing an object in a three-dimensional shape as a set of points, processing of classifying points as a predictive point or a reference point, deriving predictive values of attribute information of predictive points using attribute information of reference points, and deriving difference values between the attribute information of the predictive points and the predictive values, for the reference points, wherein the inverse hierarchization unit may derive predictive values of attribute information of predictive points of a plurality of levels with reference to attribute information of reference points of the same levels and add the derived predictive values to difference values to generate attribute information of the predictive points at the time of inverse hierarchization. In other words, an information processing device that processes attribute information of respective points of a point cloud representing an object in a three-dimensional shape as a set of points may include an inverse hierarchization unit that performs inverse hierarchization on attribute information hierarchized by recursively repeating processing of deriving difference values between predictive values of attribute information of predictive points, derived using attribute information of reference points among points classified as a predictive point or a reference point, and the attribute information of the predictive points for the reference points, wherein the inverse hierarchization unit may derive predictive values of attribute information of predictive points of a plurality of levels with reference to attribute information of reference points of the same levels and add the derived predictive values to difference values to generate attribute information of the predictive points at the time of inverse hierarchization.

By doing so, attribute data in which reference relations in a configuration in which the number of points monotonically increases from a higher level to a lower level have been constructed can be correctly inversely hierarchized, and thus reduction in encoding efficiency can be curbed.

For example, a reference destination of nodes (points) of a processing target level may be searched for at a level higher by two levels, as described in "method 4" in the fourth row of the table shown in FIG. 9. By doing so, attribute data in which reference relations in a configuration in which the number of points monotonically increases from a higher level to a lower level have been constructed, as illustrated in FIG. 10, can be correctly inversely hierarchized. Therefore, reduction in subjective image quality can be suppressed.

Control Information

For example, inverse hierarchization may be performed (inverse hierarchization methods may be switched between) on the basis of signaled attribute data (transmitted from an encoding side to a decoding side), as described in "method 4-1" in the fifth row of the table shown in FIG. 9.

The content of this control information is arbitrary. For example, the aforementioned merge_lower_lod_flag may be used. merge_lower_lod_flag may also be control information representing whether the same level is referred to with another level at the time of inverse hierarchization. That is, a level of a reference destination can be identified on the basis of merge_lower_lod_flag at the time of inverse hierarchization. For example, a level that is a reference destination of a processing target level may be identified on the basis of merge_lower_lod_flag and a predictive value of attribute data of a predictive point of the processing target level may be derived with reference to attribute data of a reference point of the identified level.

By using such control information, inverse hierarchization can be performed through the same method as that used at the time of encoding. Therefore, it is possible to curb reduction in encoding efficiency.

Case in Which Control Information is Not Used

Meanwhile, an inverse hierarchization method may be set without using the aforementioned control information. For example, on a decoding side, the number of points of a processing target level may be compared to the number of points of a level higher by one level, and a predictive value of attribute information of a predictive point may be derived with reference to attribute information of a reference point of a level higher by two levels with respect to a level having the number of points that are not sufficiently greater than the number of points of the level higher by one level. That is, the same determination processing as that performed on an encoding side may be performed on the decoding side, and reference relations may be constructed on the basis of the determination result, and predictive values may be derived.

By doing so, inverse hierarchization can be performed through the same method as that used at the time of encoding. Therefore, it is possible to curb reduction in encoding efficiency. Further, transmission of control information can be omitted, and thus reduction in encoding efficiency can be further curbed.

3. First Embodiment

Encoding Device

Figure 11:
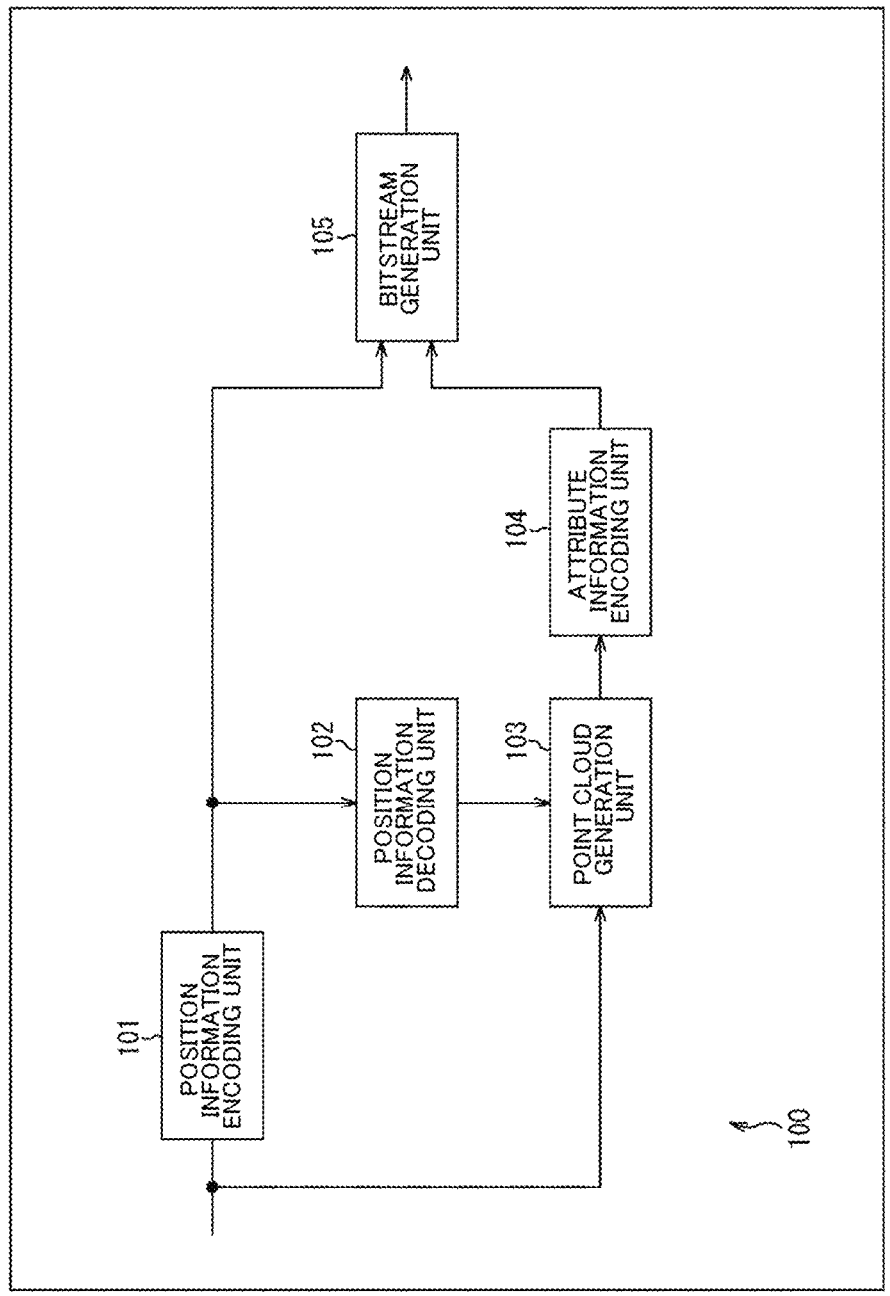
FIG. 11 is a block diagram illustrating an example of major components of an encoding device.

Next, a device to which the present technology described above in <1. Switching of hierarchization/inverse hierarchization method> is applied will be described. FIG. 11 is a block diagram illustrating an example of a configuration of an encoding device that is an aspect of an information processing device to which the present technology is applied. An encoding device 100 illustrated in FIG. 11 is a device that encodes a point cloud (3D data). The encoding device 100 encodes the point cloud using the present technology described above in <1. Switching of hierarchization/ inverse hierarchization method>.

Meanwhile, FIG. 11 illustrates major parts such as processing units and data flows, but processing units and data flows are not limited to those illustrated in FIG. 11. That is, processing units that are not illustrated in FIG. 11 as blocks and processing and data flows that are not illustrated in FIG. 11 as arrows and the like may be present in the encoding device 100.

As illustrated in FIG. 11, the encoding device 100 includes a position information encoding unit 101, a position information decoding unit 102, a point cloud generation unit 103, an attribute information encoding unit 104, and a bitstream generation unit 105.

The position information encoding unit 101 encodes geometry data (position information) of point clouds (3D data) input to the encoding device 100. This encoding method may be any method corresponding to scalable decoding. For example, the position information encoding unit 101 hierarchizes the geometry data to generate an octree and encodes the octree. In addition, processing such as filtering and quantization for suppressing noise (denoising), for example, may be performed. The position information encoding unit 101 supplies the generated encoded data of the geometry data to the position information decoding unit 102 and the bitstream generation unit 105.

The position information decoding unit 102 acquires the encoded data of the geometry data supplied from the position information encoding unit 101 and decodes the encoded data. This decoding method may be any method corresponding to encoding performed by the position information encoding unit 101. For example, processing such as filtering and quantization for denoising may be performed. The position information decoding unit 102 supplies generated geometry data (a decoding result) to the point cloud generation unit 103.

The point cloud generation unit 103 acquires attribute data (attribute information) of point clouds input to the encoding device 100 and the geometry data (decoding result) supplied from the position information decoding unit 102. The point cloud generation unit 103 performs processing of associating the attribute data with the geometry data (decoding result) (recolor processing). The point cloud generation unit 103 supplies the attribute data associated with the geometry data (decoding result) to the attribute information encoding unit 104.

The attribute information encoding unit 104 acquires the geometry data (decoding result) and the attribute data supplied from the point cloud generation unit 103. The attribute information encoding unit 104 encodes the attribute data using the geometry data (decoding result) and generates encoded data of the attribute data.

In that case, the attribute information encoding unit 104 encodes the attribute data using the present technology described above in <1. Switching of hierarchization/inverse hierarchization method>. For example, the attribute information encoding unit 104 switches between hierarchization methods for the attribute data at a middle level in hierarchization of the attribute data. The attribute information encoding unit 104 supplies the generated encoded data of the attribute data to the bitstream generation unit 105.

The bitstream generation unit 105 acquires the encoded data of the position information supplied from the position information encoding unit 101. In addition, the bitstream generation unit 105 acquires the encoded data of the attribute information supplied from the attribute information encoding unit 104. The bitstream generation unit 105 generate a bitstream including the encoded data. The bitstream generation unit 105 outputs the generated bitstream to the outside of the encoding device 100.

By employing this configuration, the encoding device 100 can form a hierarchical structure of attribute data using a plurality of hierarchization methods. Accordingly, hierarchization can be performed on more varied types of attribute data through a more suitable method to curb reduction in encoding efficiency.

Meanwhile, these processing units (the position information encoding unit 101 to the bitstream generation unit 105) of the encoding device 100 have arbitrary configurations. For example, each processing unit may be configured as a logic circuit for realizing the aforementioned processing. In addition, each processing unit may include, for example, a central processing unit (CPU), a read only memory (ROM), a random access memory (RAM), and the like and execute a program using these components to realize the aforementioned processing. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

Attribute Information Encoding Unit

Figure 12:
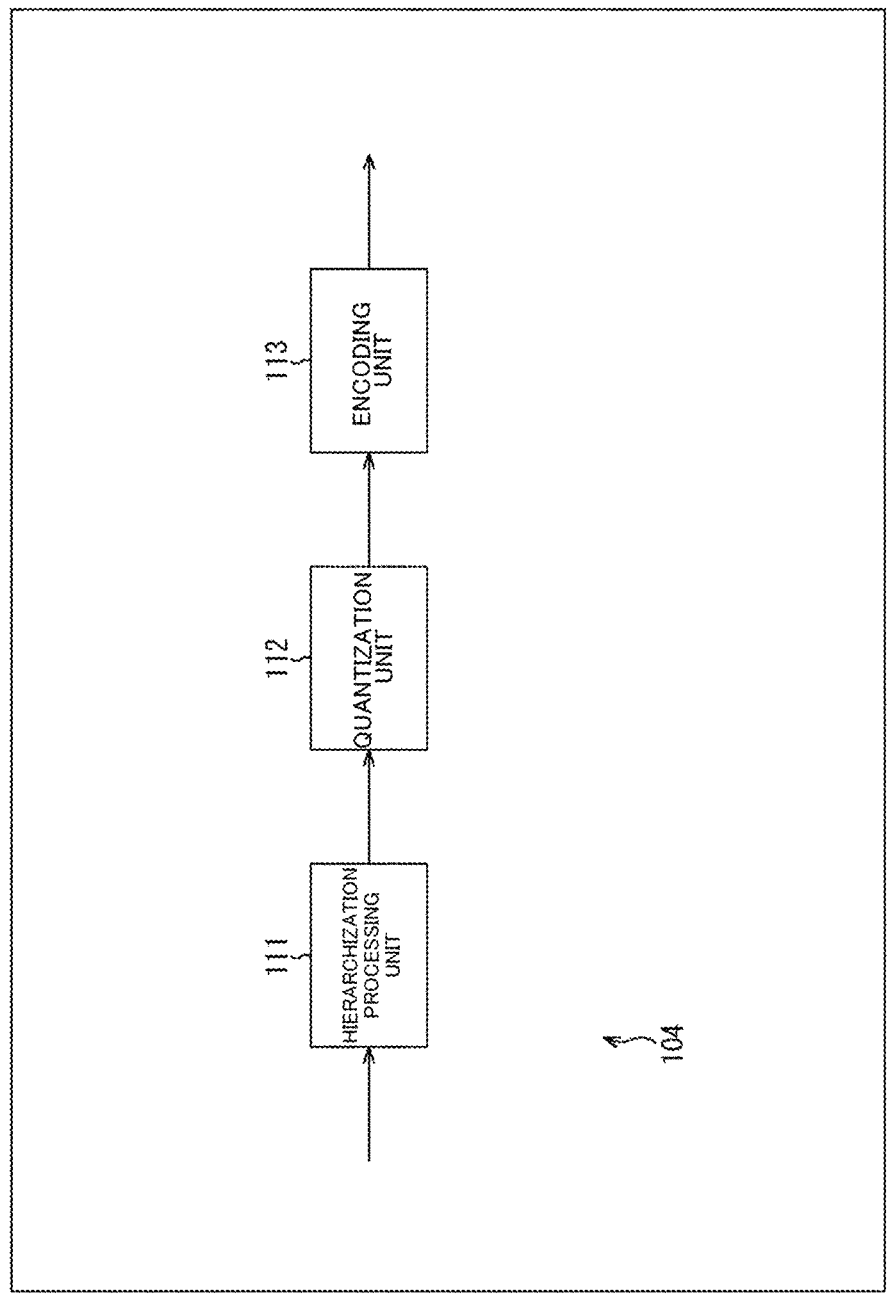
FIG. 12 is a block diagram illustrating an example of major components of an attribute information encoding unit.

FIG. 12 is a block diagram illustrating an example of major components of the attribute information encoding unit 104 (FIG. 11). Meanwhile, FIG. 12 illustrates major parts such as processing units and data flows, but processing units and data flows are not limited to those illustrated in FIG. 12. That is, processing units that are not illustrated in FIG. 12 as blocks and processing and data flows that are not illustrated in FIG. 12 as arrows and the like may be present in the attribute information encoding unit 104.

As illustrated in FIG. 12, the attribute information encoding unit 104 includes a hierarchization processing unit 111, a quantization unit 112, and an encoding unit 113.

The hierarchization processing unit 111 performs processing with respect to hierarchization of attribute data. For example, the hierarchization processing unit 111 acquires attribute data and geometry data (decoding result) supplied from the point cloud generation unit 103. The hierarchization processing unit 111 hierarchizes the attribute data using the geometry data. In that case, the hierarchization processing unit 111 performs hierarchization using the present technology described above in <1. Switching of hierarchization/inverse hierarchization method>. For example, the hierarchization processing unit 111 switches between hierarchization methods for the attribute data at a middle level in hierarchization of the attribute data. In other words, the hierarchization processing unit 111 performs hierarchization on the attribute data using a plurality of hierarchization methods and generates different levels according to the hierarchization methods. The hierarchization processing unit 111 supplies the hierarchized attribute data (difference values) to the quantization unit 112. In that case, the hierarchization processing unit 111 also generates control information about hierarchization. The hierarchization processing unit 111 also supply the generated control information to the quantization unit 112 along with the attribute data (difference values).

The quantization unit 112 acquires the attribute data (difference values) and the control information supplied from the hierarchization processing unit 111. The quantization unit 112 quantizes the attribute data (difference values). A method for the quantization is arbitrary. The quantization unit 112 supplies the quantized attribute data (difference values) and the control information to the encoding unit 113.

The encoding unit 113 acquires the quantized attribute data (difference values) and the control information supplied from the quantization unit 112. The encoding unit 113 encodes the quantized attribute data (difference values) to generate encoded data of the attribute data. A method for the encoding is arbitrary. In addition, the encoding unit 113 includes the control information in the generated encoded data. In other words, the encoding unit 113 generates encoded data of the attribute data including the control information. The encoding unit 113 supplies the generated encoded data to the bitstream generation unit 105.

By performing hierarchization as described above, the attribute information encoding unit 104 can form a hierarchical structure of the attribute data using a plurality of hierarchization methods. Accordingly, hierarchization can be performed on more varied types of attribute data through a more suitable method to curb reduction in encoding efficiency.

Meanwhile, the processing units (hierarchization processing unit 111 to the encoding unit 113) have arbitrary configurations. For example, each processing unit may be configured as a logic circuit for realizing the aforementioned processing. Further, each processing unit may include, for example, a CPU, a ROM, a RAM, and the like and execute a program using these components to realize the aforementioned processing. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

Hierarchization Processing Unit

Figure 13:
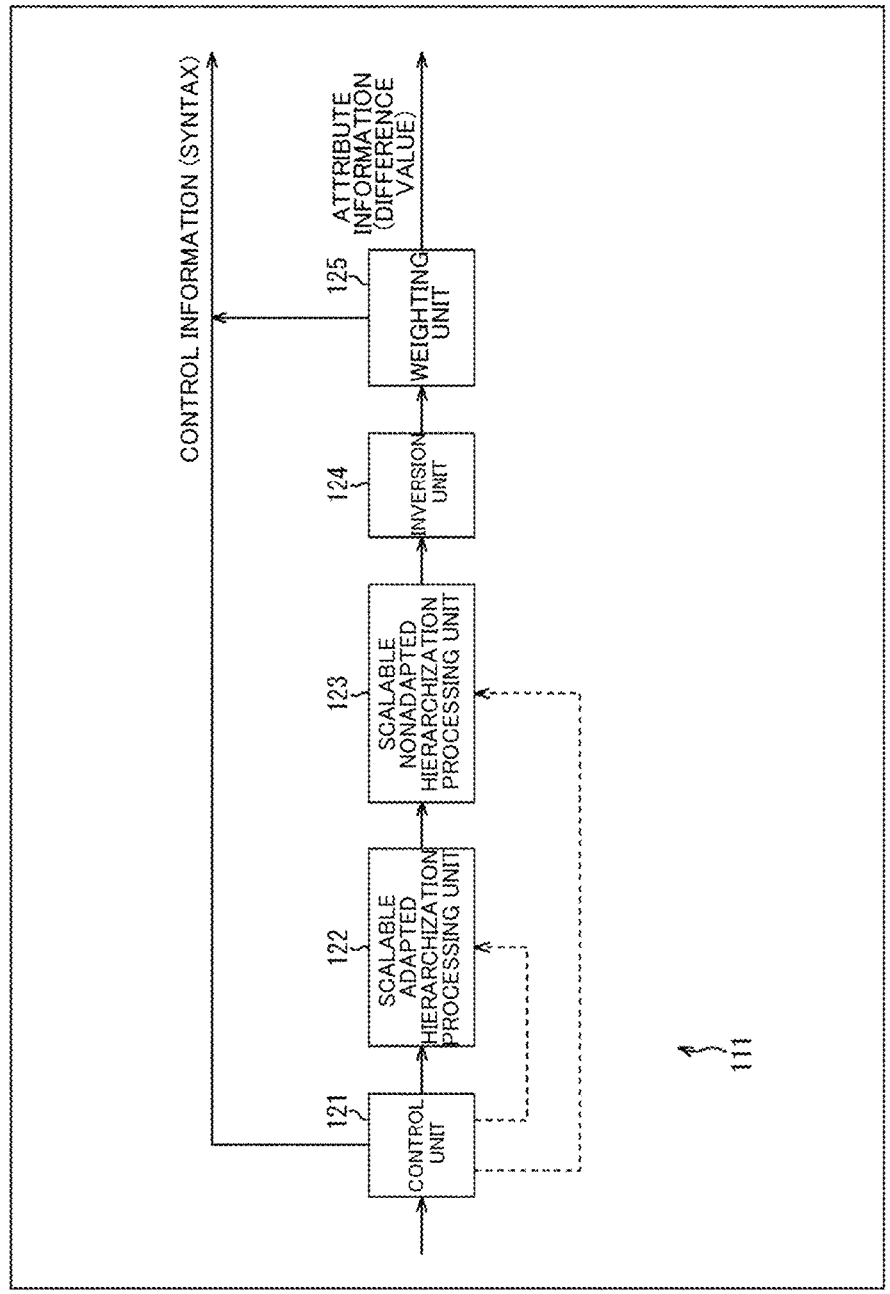
FIG. 13 is a block diagram illustrating an example of major components of a hierarchization processing unit.

FIG. 13 is a block diagram illustrating an example of major components of the hierarchization processing unit 111 (FIG. 12). Meanwhile, FIG. 13 illustrates major parts such as processing units and data flows, but processing units and data flows are not limited to those illustrated in FIG. 13. That is, processing units that are not illustrated in FIG. 13 as blocks and processing and data flows that are not illustrated in FIG. 13 as arrows and the like may be present in the hierarchization processing unit 111.

Here, description will be given on the assumption that the hierarchization processing unit 111 switches between a hierarchization method adapted to scalable decoding and a hierarchization method that is not adapted to scalable decoding at a middle layer. The hierarchization processing unit 111 as illustrated in FIG. 13 includes a control unit 121, a scalable adapted hierarchization processing unit 122, a scalable nonadapted hierarchization processing unit 123, an inversion unit 124, and a weighting unit 125.

The control unit 121 performs processing with respect to control of hierarchization. For example, the control unit 121 acquires attribute data and geometry data (decoding result) supplied from the point cloud generation unit 103. The control unit 121 supplies the acquired attribute data and geometry data (decoding result) to the scalable adapted hierarchization processing unit 122.

In addition, the control unit 121 controls the scalable adapted hierarchization processing unit 122 and the scalable nonadapted hierarchization processing unit 123 to cause them to execute hierarchization. For example, the control unit 121 causes hierarchization to be performed using the present technology described above in <1. Switching of hierarchization/inverse hierarchization method>. That is, the control unit 121 drives the scalable adapted hierarchization processing unit 122, the scalable nonadapted hierarchization processing unit 123, or both thereof and causes them to perform hierarchization according to hierarchization methods thereof, for example.

In addition, the control unit 121 generates control information about hierarchization of the attribute data and supplies the control information to the quantization unit 112.

The scalable adapted hierarchization processing unit 122 performs processing with respect to hierarchization of the attribute data according to a method adapted to scalable decoding (e.g., the hierarchization method described in NPL 3). For example, the scalable adapted hierarchization processing unit 122 acquires the attribute data and the geometry data (decoding result) supplied from the control unit 121.

The scalable adapted hierarchization processing unit 122 hierarchizes the acquired attribute data through a method adapted to scalable decoding using the acquired geometry data according to control of the control unit 121. For example, the scalable adapted hierarchization processing unit 122 generates a level designated by the control unit 121 (e.g., a level permitted to be subjected to execution of processing, a level for which processing is not prohibited is also possible) using a method adapted to scalable decoding.

The scalable adapted hierarchization processing unit 122 supplies attribute data of the generated level, attribute data that has not been hierarchized, the geometry data, and the like to the scalable nonadapted hierarchization processing unit 123.

Meanwhile, when the control unit 121 does not permit hierarchization, the scalable adapted hierarchization processing unit 122 can omit hierarchization. In such a case, the scalable adapted hierarchization processing unit 122 supplies all the acquired attribute data and geometry data to the scalable nonadapted hierarchization processing unit 123.

The scalable nonadapted hierarchization processing unit 123 performs processing with respect to hierarchization of attribute data according to a method that is not adapted to scalable decoding (e.g., lifting described in NPL 2). For example, the scalable nonadapted hierarchization processing unit 123 acquires the attribute data and the geometry data (decoding result) supplied from the scalable adapted hierarchization processing unit 122.

The scalable nonadapted hierarchization processing unit 123 hierarchizes attribute data that is not hierarchized through a method that is not adapted to scalable decoding using the acquired geometry data according to control of the control unit 121. For example, the scalable nonadapted hierarchization processing unit 123 generates a level designated by the control unit 121 (e.g., a level permitted to be subjected to execution of processing, a level for which processing is not prohibited is also possible) using a method that is not adapted to scalable decoding.

All levels of attribute data are generated (all attribute data is hierarchized) according to hierarchization performed by the scalable adapted hierarchization processing unit 122 and the scalable nonadapted hierarchization processing unit 123.

The scalable nonadapted hierarchization processing unit 123 supplies the hierarchized attribute data to the inversion unit 124.

Meanwhile, when the control unit 121 does not permit hierarchization, the scalable nonadapted hierarchization processing unit 123 can omit hierarchization. In such a case, all the acquired attribute data is hierarchized, and the scalable adapted hierarchization processing unit 122 supplies this attribute data to the inversion unit 124.

The inversion unit 124 performs processing with respect to inversion of levels. For example, the inversion unit 124 acquires the hierarchized attribute data supplied from the scalable nonadapted hierarchization processing unit 123. In this attribute data, information of each level has been hierarchized in order of generation.

The inversion unit 124 inverts levels of the attribute data. For example, the inversion unit 124 assigns a level number (a number for identifying a level which increments by 1 whenever one level decreases from the highest level 0 to reach a maximum value corresponding to the lowest level) to each level of the attribute data in a reverse order to that of generation such that the order of generation becomes the order from the lowest level to the highest level.

The inversion unit 124 supplies the attribute data in which the levels have been inverted to the weighting unit 125.

The weighting unit 125 performs processing with respect to weighting. For example, the weighting unit 125 acquires the attribute data supplied from the inversion unit 124. The weighting unit 125 derives a weight value of the acquired attribute data. A method for deriving a weight value is arbitrary. The method for deriving a weight value may be changed at a level generated by the scalable adapted hierarchization processing unit 122 and a level generated by the scalable nonadapted hierarchization processing unit 123.

The weighting unit 125 supplies the attribute data (difference values) and the derived weight value to the quantization unit 112 (FIG. 12). In addition, the weighting unit 125 may supply the derived weight value to the quantization unit 112 as control information and cause the control information to be transmitted to a decoding side.

The control unit 121 controls the scalable adapted hierarchization processing unit 122 and a level generated by the scalable nonadapted hierarchization processing unit 123 and switches between attribute data hierarchization methods at a middle level as described above in <1. Switching of hierarchization/inverse hierarchization method>. By doing so, the hierarchization processing unit 111 can form a hierarchical structure of attribute data using a plurality of hierarchization methods. Accordingly, hierarchization can be performed on more varied types of attribute data through a more suitable method to curb reduction in encoding efficiency.

Meanwhile, the processing units (the control unit 121 to the weighting unit 125) have arbitrary configurations. For example, each processing unit may be configured as a logic circuit for realizing the aforementioned processing. Further, each processing unit may include, for example, a CPU, a ROM, a RAM, and the like and execute a program using these components to realize the aforementioned processing. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

Flow of Encoding Processing

Next, processing executed by the encoding device 100 will be described. The encoding device 100 encodes data of a point cloud by executing encoding processing. An example of a flow of this encoding processing will be described with reference to the flowchart of FIG. 14.

When encoding processing is started, the position information encoding unit 101 of the encoding device 100 encodes geometry data (position information) of an input point cloud to generate encoded data of the geometry data in step S101.

In step S102, the position information decoding unit 102 decodes the encoded data of the geometry data generated in step S101 to generate position information.

In step S103, the point cloud generation unit 103 performs recolor processing using attribute data (attribute information) of the input point cloud and the geometry data (decoding result) generated in step S102 to associate the attribute data with the geometry data.

In step S104, the attribute information encoding unit 104 encodes the attribute data on which recolor processing has been executed in step S103 by executing attribute information encoding processing to generate encoded data of the attribute data. In that case, the attribute information encoding unit 104 encodes the attribute data using the present technology described above in <1. Switching of hierarchization/inverse hierarchization method>. For example, the attribute information encoding unit 104 switches between hierarchization methods for the attribute data at a middle level in hierarchization of the attribute data. Details of attribute information encoding processing will be described later.

In step S105, the bitstream generation unit 105 generates and outputs a bitstream including the encoded data of the geometry data generated in step S101 and the encoded data of the attribute data generated in step S104.

When processing of step S105 ends, encoding processing ends.

In this manner, the encoding device 100 can form a hierarchical structure of the attribute data using a plurality of hierarchization methods by performing processing of each step. Accordingly, hierarchization can be performed on more various types of attribute information through a more suitable method to curb reduction in encoding efficiency.

Flow of Attribute Information Encoding Processing

Next, an example of the flow of attribute information encoding processing executed in step S104 of FIG. 14 will be described with reference to the flowchart of FIG. 15.

When attribute information encoding processing is started, the hierarchization processing unit 111 of the attribute information encoding unit 104 hierarchizes attribute data by executing hierarchization processing and derives a difference value of attribute data of each point in step S111. In that case, the hierarchization processing unit 111 performs hierarchization using the present technology described above in <1. Switching of hierarchization/inverse hierarchization method>. For example, hierarchization processing unit 111 switches between attribute data hierarchization methods at a middle level. Details of hierarchization processing will be described later.

In step S112, the quantization unit 112 quantizes each difference value derived in step S111.

In step S113, the encoding unit 113 encodes difference values quantized in step S112 to generate encoded data of the attribute data.

When processing of step S113 ends, attribute information encoding processing ends and processing returns to FIG. 14.

In this manner, the attribute information encoding unit 104 can form a hierarchical structure of the attribute data using a plurality of hierarchization methods by performing processing of each step. Accordingly, hierarchization can be performed on more various types of attribute information through a more suitable method to curb reduction in encoding efficiency.

Flow of Hierarchization Processing

Next, an example of the flow of hierarchization processing executed in step S111 of FIG. 15 will be described with reference to the flowchart of FIG. 16.

When hierarchization processing is started, the control unit 121 of the hierarchization processing unit 111 sets an application range of a method adapted to scalable decoding in step S121. The control unit 121 controls hierarchization on the basis of this setting.

In step S122, the scalable adapted hierarchization processing unit 122 generates levels within the application range of the method adapted to scalable decoding set in step S121 according to the method adapted to scalable decoding. That is, the scalable adapted hierarchization processing unit 122 sets a reference point and a predictive point using the method adapted to scalable decoding with respect to each level that is encoded such that scalable decoding can be performed, derives a predictive value of attribute data of the predictive point using attribute data of the reference point, and derives a difference value between the attribute data of the predictive point and the predictive value.

In step S123, the scalable nonadapted hierarchization processing unit 123 generates levels that are not generated in step S122, that is, levels outside the application range of the method adapted to scalable decoding set in step S121, according to a method that is not adapted to scalable decoding. That is, the scalable nonadapted hierarchization processing unit 123 sets a reference point and a predictive point using the method that is not adapted to scalable decoding with respect to each level that is encoded such that scalable decoding cannot be performed, derives a predictive value of attribute data of the predictive point using attribute data of the reference point, and derives a difference value between the attribute data of the predictive point and the predictive value.

When all levels of the attribute data are generated according to processing of step S122 and step S123, the inversion unit 124 inverts the generated levels of the attribute data and assigns level numbers to the respective levels in a reverse order to that of generation in step S124.

In step S125, the weighting unit 125 derives a weight value with respect to attribute data of each level.

In step S126, the control unit 121 generates control information about hierarchization of the attribute data, supplies the control information to the quantization unit 112, and causes the control information to be transmitted to a decoding side.

When processing of step S126 ends, processing returns to FIG. 15.

In this manner, the hierarchization processing unit 111 can form a hierarchical structure of the attribute data using a plurality of hierarchization methods by performing processing of each step. Accordingly, hierarchization can be performed on more varied types of attribute data through a more suitable method to curb reduction in encoding efficiency.

4. Second Embodiment

Decoding Device

Figure 17:
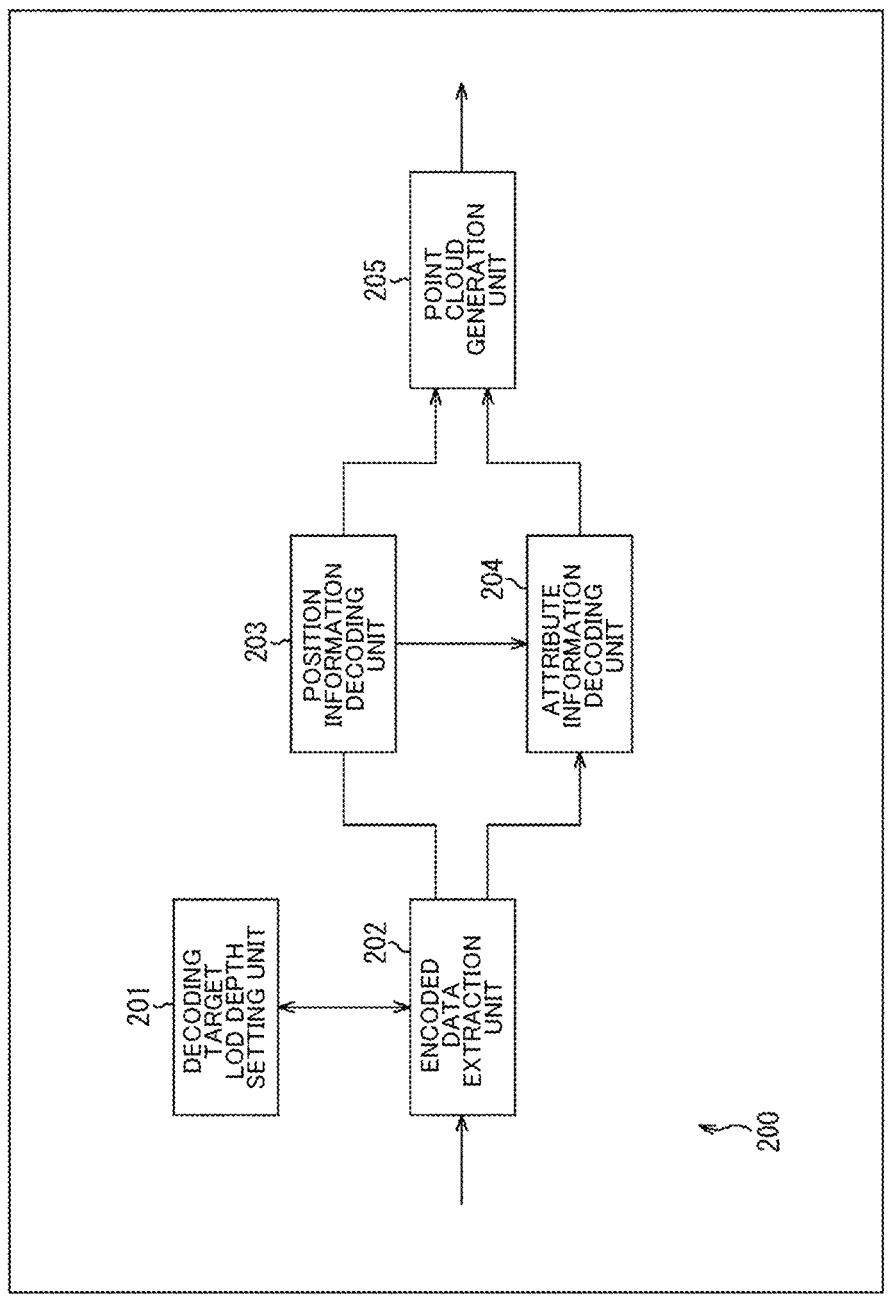
FIG. 17 is a block diagram illustrating an example of major components of a decoding device.

Next, a device to which the present technology described above in <1. Switching of hierarchization/inverse hierarchization method> is applied will be described. FIG. 17 is a block diagram illustrating an example of a configuration of a decoding device that is one aspect to which the present technology is applied. A decoding device 200 illustrated in FIG. 17 is a device that decodes encoded data of a point cloud (3D data). The decoding device 200 decodes encoded data of a point cloud using the present technology described above in <1. Switching of hierarchization/inverse hierarchization method>.

Meanwhile, FIG. 17 illustrates major parts such as processing units and data flows, but processing units and data flows are not limited to those illustrated in FIG. 17. That is, processing units that are not illustrated in FIG. 17 as blocks and processing and data flows that are not illustrated in FIG. 17 as arrows and the like may be present in the decoding device 200.

As illustrated in FIG. 17, the decoding device 200 includes a decoding target LoD depth setting unit 201, an encoded data extraction unit 202, a position information decoding unit 203, an attribute information decoding unit 204, and a point cloud generation unit 205.

The decoding target LoD depth setting unit 201 performs processing with respect to setting of a depth of a level (LoD) that is a decoding target. For example, the decoding target LoD depth setting unit 201 sets a level to which encoded data of point clouds held in the encoded data extraction unit 202 will be decoded. A method of setting a level depth that is a decoding target is arbitrary.

For example, the decoding target LoD depth setting unit 201 may set a level depth on the basis of an instruction with respect to the level depth from the outside such as a user or an application. In addition, the decoding target LoD depth setting unit 201 may obtain a level depth that is a decoding target on the basis of arbitrary information such as an output image and set the level depth.

For example, the decoding target LoD depth setting unit 201 may set a level depth that is a decoding target on the basis of a viewpoint position, a direction, an angle of view, movement of a viewpoint (movement, panning, tilting, and zooming), and the like of a 2-dimensional image generated from point clouds.

Meanwhile, a data unit for setting a level depth that is a decoding target is arbitrary. For example, the decoding target LoD depth setting unit 201 can set a level depth with respect to all point clouds, set a level depth for each object, or set a level depth for each partial region in an object. It goes without saying that a level depth can also be set in a data unit other than these examples.

The encoded data extraction unit 202 acquires and holds bitstreams input to the decoding device 200. The encoded data extraction unit 202 extracts encoded data of geometry data (position information) and attribute data (attribute information) from the highest level to a level designated by the decoding target LoD depth setting unit 201 from the bitstreams held therein. The encoded data extraction unit 202 supplies the extracted encoded data of the geometry data to the position information decoding unit 203. The encoded data extraction unit 202 supplies the extracted encoded data of the attribute data to the attribute information decoding unit 204.

The position information decoding unit 203 acquires the encoded data of the geometry data supplied from the encoded data extraction unit 202. The position information decoding unit 203 decodes the encoded data of the geometry data to generate geometry data (decoding result). This decoding method may be the same as that used for the position information decoding unit 102 of the encoding device 100. The position information decoding unit 203 supplies the generated geometry data (decoding result) to the attribute information decoding unit 204 and the point cloud generation unit 205.

The attribute information decoding unit 204 acquires the encoded data of the attribute data supplied from the encoded data extraction unit 202. The attribute information decoding unit 204 acquires the geometry data (decoding result) supplied from the position information decoding unit 203. The attribute information decoding unit 404 decodes the encoded data of the attribute data according to a method using the present technology described above in <1. Switching of hierarchization/inverse hierarchization method> using the position information (decoding result) to generate attribute data (decoding result). For example, the attribute information decoding unit 204 switches between inverse hierarchization methods for the attribute data at a middle level. The attribute information decoding unit 204 supplies the generated attribute data (decoding result) to the point cloud generation unit 405.

The point cloud generation unit 205 acquires the geometry data (decoding result) supplied from the position information decoding unit 203. The point cloud generation unit 205 acquires the attribute data (decoding result) supplied from the attribute information decoding unit 204. The point cloud generation unit 205 generates point clouds (decoding result) using the geometry data (decoding result) and the attribute data (decoding result). The point cloud generation unit 205 outputs data of the generated point clouds (decoding result) to the outside of the decoding device 200.

By employing such a configuration, the decoding device 200 can perform inverse hierarchization using a plurality of hierarchization methods and thus can correctly inversely hierarchize attribute data hierarchized using a plurality of hierarchization methods. That is, encoded data that has been encoded using a plurality of hierarchization methods can be correctly decoded. Accordingly, it is possible to curb reduction in encoding efficiency.

Meanwhile, the processing units (the decoding target LoD depth setting unit 201 to the point cloud generation unit 205) have arbitrary configurations. For example, each processing unit may be configured as a logic circuit for realizing the aforementioned processing. Further, each processing unit may include, for example, a CPU, a ROM, a RAM, and the like and execute a program using these components to realize the aforementioned processing. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

Attribute Information Decoding Unit

Figure 18:
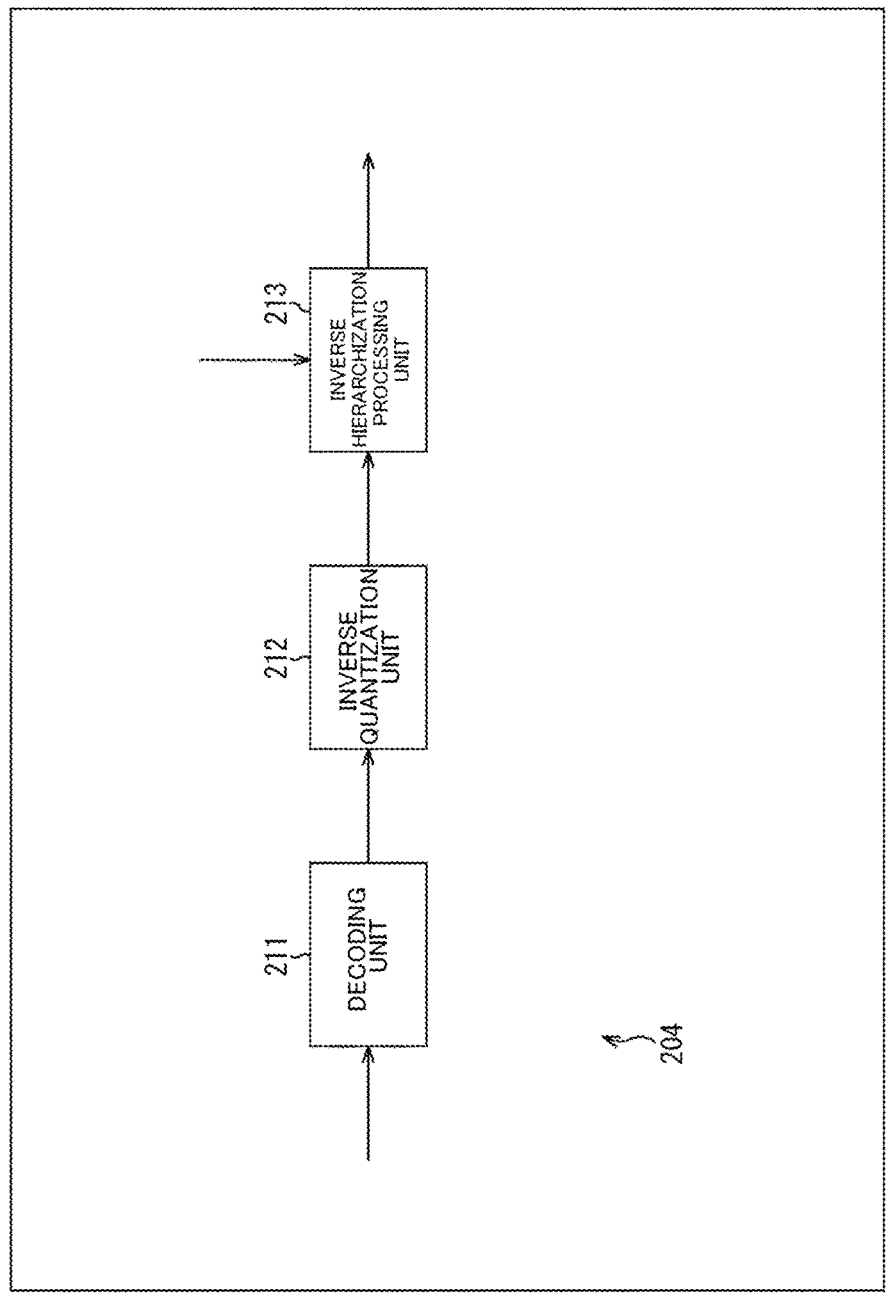
FIG. 18 is a block diagram illustrating an example of major components of an attribute information decoding unit.

FIG. 18 is a block diagram illustrating an example of major components of the attribute information decoding unit 204 (FIG. 17). Meanwhile, FIG. 18 illustrates major parts such as processing units and data flows, but processing units and data flows are not limited to those illustrated in FIG. 18. That is, processing units that are not illustrated in FIG. 18 as blocks and processing and data flows that are not illustrated in FIG. 18 as arrows and the like may be present in the attribute information decoding unit 204.

As illustrated in FIG. 18, the attribute information decoding unit 204 includes a decoding unit 211, an inverse quantization unit 212, and an inverse hierarchization processing unit 213.

The decoding unit 211 performs processing with respect to decoding of encoded data of attribute data. For example, the decoding unit 211 acquires encoded data of attribute data supplied from the attribute information decoding unit 204.

The decoding unit 211 decodes the encoded data of the attribute data to generate attribute data (decoding result). This decoding method may be a method corresponding to the encoding method performed by the encoding unit 113 (FIG. 12) of the encoding device 100. In addition, the generated attribute data (decoding result) corresponds to attribute data before being encoded and it is difference values between the attribute data and predictive values thereof and has been quantized, as described in the first embodiment. The decoding unit 211 supplies the generated attribute data (decoding result) to the inverse quantization unit 212.

Meanwhile, when the encoded data of the attribute data includes control information about weight values and control information about hierarchization of the attribute data, the decoding unit 211 also supplies the control information to the inverse quantization unit 212.

The inverse quantization unit 212 performs processing with respect to inverse quantization of the attribute data. The inverse quantization unit 212 acquires the attribute data (decoding result) and the control information supplied from the decoding unit 211.

The inverse quantization unit 212 inversely quantizes the attribute data (decoding result). In that case, when the control information about weight values is supplied from the decoding unit 211, the inverse quantization unit 212 also acquires the control information and performs inverse quantization on the attribute data (decoding result) on the basis of the control information (using weight values derived on the basis of the control information).

In addition, when the control information about hierarchization of the attribute data is supplied from the decoding unit 211, the inverse quantization unit 212 also acquires this control information.

The inverse quantization unit 212 supplies the inversely quantized attribute data (decoding result) to the inverse hierarchization processing unit 213. Further, when the control information about hierarchization of the attribute data has been acquired from the decoding unit 211, the inverse quantization unit 212 also supplies this control information to the inverse hierarchization processing unit 213.

The inverse hierarchization processing unit 213 acquires the inversely quantized attribute data (decoding result) supplied from the inverse quantization unit 212. As described above, this attribute data is difference values. In addition, the inverse hierarchization processing unit 213 acquires geometry data (decoding result) supplied from the position information decoding unit 203. The inverse hierarchization processing unit 213 performs inverse hierarchization, which is inverse processing of hierarchization performed by the hierarchization processing unit 111 (FIG. 12) of the encoding device 100, on the acquired attribute data (difference values) using the geometry data.

In that case, the inverse hierarchization processing unit 213 performs inverse hierarchization using the present technology described above in <1. Switching of hierarchization/inverse hierarchization method>. That is, the inverse hierarchization processing unit 213 switches between attribute information hierarchization methods at a middle level in inverse hierarchization (that is, switches between inverse hierarchization methods). The inverse hierarchization processing unit 213 supplies the inversely hierarchized attribute data to the point cloud generation unit 205 (FIG. 17) as a decoding result.

By performing inverse hierarchization as described above, the attribute information decoding unit 204 can correctly inversely hierarchize attribute data hierarchized using a plurality of hierarchization methods. That is, encoded data that has been encoded using a plurality of hierarchization methods can be correctly decoded. Accordingly, it is possible to curb reduction in encoding efficiency.

Meanwhile, the processing units (the decoding unit 211 to the inverse hierarchization processing unit 213) have arbitrary configurations. For example, each processing unit may be configured as a logic circuit for realizing the aforementioned processing. Further, each processing unit may include, for example, a CPU, a ROM, a RAM, and the like and execute a program using these components to realize the aforementioned processing. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

Hierarchization Processing Unit

Figure 19:
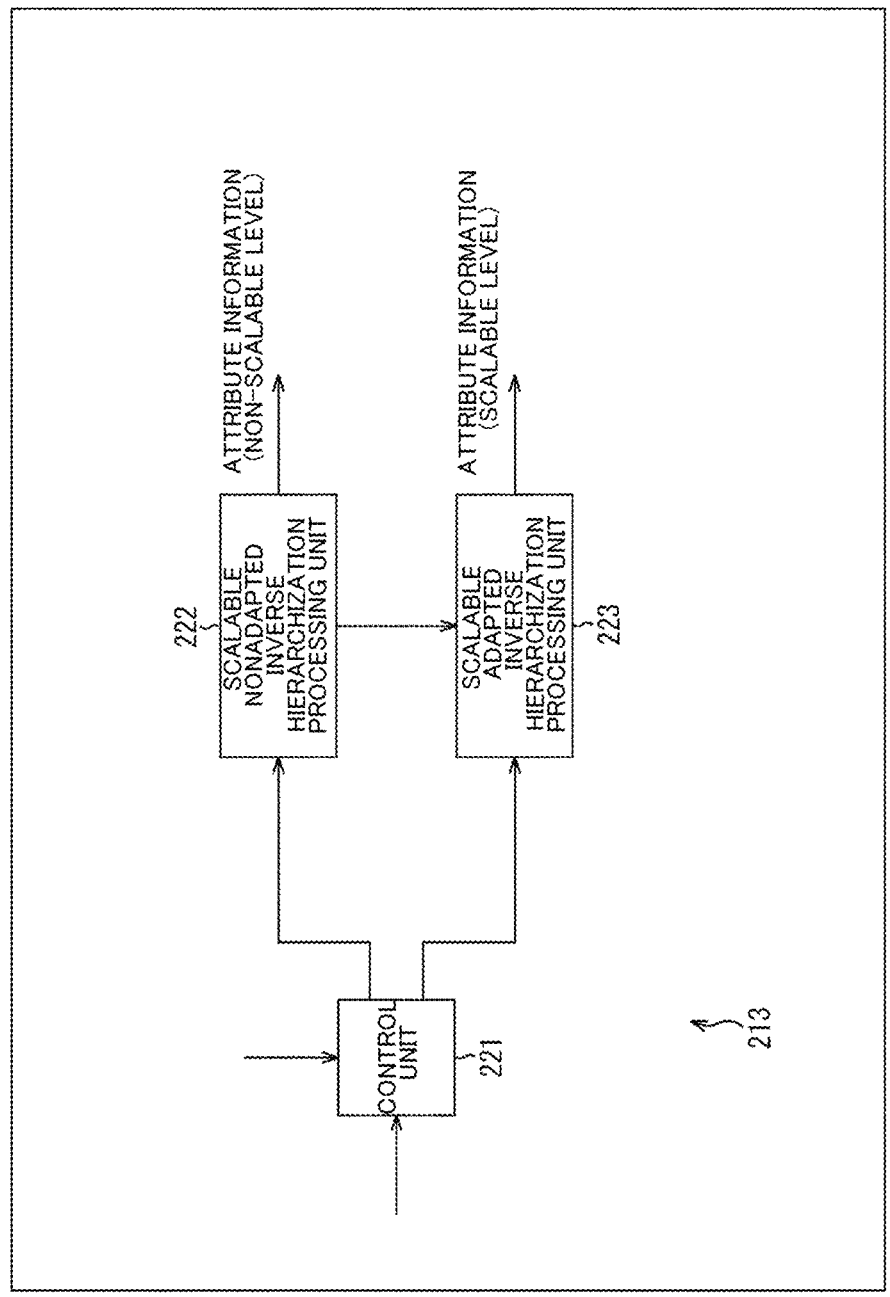
FIG. 19 is a block diagram illustrating an example of major components of an inverse hierarchization processing unit.

FIG. 19 is a block diagram illustrating an example of major components of the inverse hierarchization processing unit 213 (FIG. 18). Meanwhile, FIG. 19 illustrates major parts such as processing units and data flows, but processing units and data flows are not limited to those illustrated in FIG. 19. That is, processing units that are not illustrated in FIG. 19 as blocks and processing and data flows that are not illustrated in FIG. 19 as arrows and the like may be present in the inverse hierarchization processing unit 213.

Here, description will be given on the assumption that the inverse hierarchization processing unit 213 switches between an inverse hierarchization method adapted to scalable decoding and an inverse hierarchization method that is not adapted to scalable decoding at a middle level. As illustrated in FIG. 19, the inverse hierarchization processing unit 213 includes a control unit 221, a scalable nonadapted inverse hierarchization processing unit 222, and a scalable adapted inverse hierarchization processing unit 223.

The control unit 221 performs processing with respect to control of inverse hierarchization. For example, the control unit 221 acquires inversely quantized attribute data and control information about inverse hierarchization of attribute data supplied from the inverse quantization unit 212 (FIG. 18). In addition, the control unit 221 also acquires geometry data (decoding result) supplied from the position information decoding unit 203.

The control unit 221 controls the scalable nonadapted inverse hierarchization processing unit 222 and the scalable adapted inverse hierarchization processing unit 223 using the present technology described above in <1. Switching of hierarchization/inverse hierarchization method> and causes them to perform hierarchization.

For example, the control unit 221 determines whether to apply a method adapted to scalable decoding to the acquired attribute data on the basis of control information (e.g., scalable_enable_flag) representing whether the hierarchization method adapted to scalable decoding is applicable.

For example, if the control information represents that the hierarchization method adapted to scalable decoding is not applicable, the control unit 221 supplies the attribute data and the geometry data to the scalable nonadapted inverse hierarchization processing unit 222 and causes all levels of the attribute data to be inversely hierarchized using a method that is not adapted to scalable decoding.

In addition, if the control information represents that the hierarchization method adapted to scalable decoding is applicable, the control unit 221 refers to control information (e.g., scalable_enable_num_of_lod) representing a range of levels to which the hierarchization method adapted to scalable decoding is applied.

Furthermore, the control unit 221 selects whether to inversely hierarchize the attribute data that is a processing target using the method that is not adapted to scalable decoding or both the method that is not adapted to scalable decoding and the method adapted to scalable decoding on the basis of the control information.

For example, if the levels of the attribute data that is the processing target does not include at least a part of the range of levels to which the hierarchization method adapted to scalable decoding is applied, represented by the control information, the control unit 221 supplies all of the attribute data that is the processing target, the geometry data, and the like to the scalable nonadapted inverse hierarchization processing unit 222 and causes all levels of the attribute data to be inversely hierarchized according to the method that is not adapted to scalable decoding.

In addition, if the levels of the attribute data that is the processing target include at least a part of the range of levels to which the hierarchization method adapted to scalable decoding is applied, represented by the control information, for example, the control unit 221 supplies attribute data and geometry data of levels included in the range to the scalable nonadapted inverse hierarchization processing unit 222. Further, the control unit 221 supplies attribute data and geometry data of levels that are not included in the range to the scalable adapted inverse hierarchization processing unit 223. That is, the respective inverse hierarchization processing units are caused to perform inverse hierarchization through respective methods.

The scalable nonadapted inverse hierarchization processing unit 222 inversely hierarchizes the attribute data supplied from the control unit 221 through the method that is not adapted to scalable decoding using the geometry data supplied from the control unit 221. The scalable nonadapted inverse hierarchization processing unit 222 supplies the inversely hierarchized attribute data (non-scalable levels) to the point cloud generation unit 205 (FIG. 17).

The scalable adapted inverse hierarchization processing unit 223 inversely hierarchizes the attribute data supplied from the control unit 221 through the method adapted to scalable decoding using the geometry data supplied from the control unit 221. The scalable adapted inverse hierarchization processing unit 223 supplies the inversely hierarchized attribute data (non-scalable levels) to the point cloud generation unit 205 (FIG. 17).

In this manner, the control unit 221 controls the scalable nonadapted inverse hierarchization processing unit 222 and the scalable adapted inverse hierarchization processing unit 223 and switches between inverse hierarchization methods for attribute data at a middle level as described above in <1. Switching of hierarchization/inverse hierarchization method>. Accordingly, the inverse hierarchization processing unit 213 can correctly inversely hierarchize attribute data hierarchized using a plurality of hierarchization methods. That is, encoded data that has been encoded using a plurality of hierarchization methods can be correctly decoded. Accordingly, it is possible to curb reduction in encoding efficiency.

Meanwhile, the processing units (the control unit 221 to the scalable adapted inverse hierarchization processing unit 223) have arbitrary configurations. For example, each processing unit may be configured as a logic circuit for realizing the aforementioned processing. Further, each processing unit may include, for example, a CPU, a ROM, a RAM, and the like and execute a program using these components to realize the aforementioned processing. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

Flow of Decoding Processing

Next, processing executed by the decoding device 200 will be described. The decoding device 200 decodes encoded data of point clouds by executing decoding processing. A flow of this decoding processing will be described with reference to the flowchart of FIG. 20.

When decoding processing is started, the decoding target LoD depth setting unit 201 of the decoding device 200 sets an LoD depth to be decoded (i.e., a range of levels that are decoding targets) in step S201.

In step S202, the encoded data extraction unit 202 acquires and holds bitstreams and determines whether to decode levels up to a level that can be scalably decoded on the basis of the decoding target level range set in step S201 and control information (e.g., scalable_enable_num_of_lod) representing a range of levels to which a hierarchization method adapted to scalable decoding is applied.

If the decoding target level range overlaps the range of levels to which a hierarchization method adapted to scalable decoding is applied and it is determined that levels up to the level that can be scalably decoded (also called a scalable level) are decoded, processing proceeds to step S203.

In step S203, the encoded data extraction unit 202 extracts encode data of all levels in the decoding target level range. When processing of S203 ends, processing proceeds to step S205.

In addition, if the decoding target level range does not overlap the range of levels to which a hierarchization method adapted to scalable decoding is applied and it is determined that levels up to the scalable level are not decoded in step S202, processing proceeds to step S204.

In step S204, the encoded data extraction unit 202 extracts encoded data of all levels that cannot be scalably decoded (also called non-scalable levels). When processing of S204 ends, processing proceeds to step S205.

In step S205, the position information decoding unit 203 decodes encoded data of geometry data extracted in step S203 or step S204 to generate position information (decoding result).

In step S206, the attribute information decoding unit 204 decodes encoded data of attribute data extracted in step S203 or step S204 to generate attribute information (decoding result). In that case, the attribute information decoding unit 204 performs processing using the present technology described above in <1. Switching of hierarchization/inverse hierarchization method>. For example, the attribute information decoding unit 204 switches between attribute information hierarchization methods at a middle level in inverse hierarchization (i.e., switches between inverse hierarchization methods). Details of attribute information decoding processing will be described later.

In step S207, the point cloud generation unit 205 generates point clouds (decoding result) using the geometry data (decoding result) generated in step S205 and the attribute data (decoding result) generated in step S206 and outputs the point clouds.

When processing of step S205 ends, decoding processing ends.

By performing process of each step in this manner, the decoding device 200 can perform inverse hierarchization using a plurality of hierarchization methods and thus can correctly inversely hierarchize attribute data hierarchized using a plurality of hierarchization methods. That is, encoded data that has been encoded using a plurality of hierarchization methods can be correctly decoded. Accordingly, it is possible to curb reduction in encoding efficiency.

Flow of Attribute Information Decoding Processing

Next, an example of the flow of attribute information decoding processing executed in step S206 of FIG. 20 will be described with reference to the flowchart of FIG. 21.

When attribute information decoding processing is started, the decoding unit 211 of the attribute information decoding unit 204 decodes encoded data of attribute data (attribute information) to generate attribute data (decoding result) in step S211. This attribute data (decoding result) has been quantized as described above.

In step S212, the inverse quantization unit 212 inversely quantizes the attribute data (decoding result) generated in step S211 by executing quantization processing.

In step S213, the inverse hierarchization processing unit 213 inversely hierarchizes the attribute data (difference values) inversely quantized in step S212 by executing inverse hierarchization processing to derive attribute data of each point. In that case, the inverse hierarchization processing unit 213 performs inverse hierarchization using the present technology described above in <1. Switching of hierarchization/inverse hierarchization method>. For example, inverse hierarchization processing unit 213 switches between attribute information hierarchization methods at a middle level in inverse hierarchization (i.e., switches between inverse hierarchization methods). Details of inverse hierarchization processing will be described later.

When processing of step S213 ends, attribute information decoding processing ends and processing returns to FIG. 20.

By executing processing of each step in this manner, the attribute information decoding unit 204 can perform inverse hierarchization using a plurality of hierarchization methods and thus can correctly inversely hierarchize attribute data hierarchized using a plurality of hierarchization methods. That is, encoded data that has been encoded using a plurality of hierarchization methods can be correctly decoded. Accordingly, it is possible to curb reduction in encoding efficiency.

Flow of Inverse Hierarchization Processing

Next, an example of the flow of inverse hierarchization processing executed in step S213 of FIG. 21 will be described with reference to the flowchart of FIG. 22.

When inverse hierarchization processing is started, the control unit 221 of the inverse hierarchization processing unit 213 hierarchizes attribute data (decoding result) using geometry data (decoding result) in step S221. That is, the control unit 221 performs the same processing as the hierarchization processing described in the first embodiment to associate a hierarchical structure of attribute data with a hierarchical structure of geometry data with respect to a level that is a decoding target. Accordingly, attribute data (decoding result) and geometry data (decoding result) of each point are associated with each other. The following processing is performed on the basis of this association relationship.

In step S222, the scalable nonadapted inverse hierarchization processing unit 222 inversely hierarchizes attribute data of a non-scalable level.

In step S223, the control unit 221 determines whether to decode levels up to a scalable level. When it is determined that levels up to the scalable level are decoded, processing proceeds to step S224.

In step S224, the scalable adapted inverse hierarchization processing unit 223 inversely hierarchizes attribute data of the scalable level by executing scalable inverse hierarchization processing. Details of this scalable inverse hierarchization processing will be described later.

When processing of step S224 ends, inverse hierarchization processing ends, and processing returns to FIG. 21.

In addition, when it is determined that levels up to the scalable level are not decoded in step S223, process of step S224 is omitted, inverse hierarchization processing ends, and processing returns to FIG. 21.

By executing processing of each step in this manner, the inverse hierarchization processing unit 213 can perform inverse hierarchization using a plurality of hierarchization methods and thus can correctly inversely hierarchize attribute data hierarchized using a plurality of hierarchization methods. That is, encoded data that has been encoded using a plurality of hierarchization methods can be correctly decoded. Accordingly, it is possible to curb reduction in encoding efficiency.

Flow of Scalable Inverse Hierarchization Processing

Next, an example of the flow of scalable inverse hierarchization processing executed in step S224 of FIG. 22 will be described with reference to the flowchart of FIG. 23.

When scalable inverse hierarchization processing is started, the scalable adapted inverse hierarchization processing unit 223 sets a processing target LoD to the highest LoD of a scalable level in step S231.

In step S232, the scalable adapted inverse hierarchization processing unit 223 derives a predictive value of a predictive point from a reference point on the basis of geometry data of resolution of the processing target LoD.

In step S233, the scalable adapted inverse hierarchization processing unit 223 adds the predictive value derived in step S232 to difference values to reconstruct attribute information of the predictive point.

In step S234, the scalable adapted inverse hierarchization processing unit 223 merges attribute data of the predictive point and the reference point.

In step S235, the scalable adapted inverse hierarchization processing unit 223 determines whether the processing target LoD is the lowest LoD of the decoding target level range. When it is determined that the processing target LoD is the lowest LoD of the decoding target level range, processing proceeds to step S236.

In step S236, the scalable adapted inverse hierarchization processing unit 223 moves (updates) the processing target LoD to one level below. When processing of step S236 ends, processing returns to S232 and the subsequent processing is repeated.

That is, the processing of steps S232 to S236 is performed for all levels that are processing targets.

Then, when it is determined that the processing target LoD reaches the lowest LoD of the decoding target level range in step S235, that is, it is determined that all levels that are decoding targets have been processed, scalable inverse hierarchization processing ends and processing returns to FIG. 22.

By executing processing of each step in this manner, the scalable adapted inverse hierarchization processing unit 223 can correctly inversely hierarchize the scalable level that is a decoding target. That is, encoded data that has been encoded using a plurality of hierarchization methods can be correctly decoded. Accordingly, it is possible to curb reduction in encoding efficiency.

5. Third Embodiment

Encoding Device

Next, a device to which the present technology described above in <2. Switching of hierarchization/inverse hierarchization method> is applied will be described. In this case, the encoding device 100 has the same configuration as that in the first embodiment described with reference to FIG. 11 and performs basically the same processing. However, the attribute information encoding unit 104 encodes attribute data using the present technology described above in <2. Control of reference relations>. For example, the attribute information encoding unit 104 constructs reference relations by merging a plurality of levels (nodes).

Attribute Information Encoding Unit

In addition, even in this case, the attribute information encoding unit 104 has the same configuration as that in the first embodiment described with reference to FIG. 12 and performs basically the same processing. However, the hierarchization processing unit 111 performs hierarchization using the present technology described above in <2. Control of reference relations>. For example, the hierarchization processing unit 111 merges points (nodes) of a plurality of levels to construct reference relations.

Hierarchization Processing Unit

Furthermore, in this case, the hierarchization processing unit 111 also has the same configuration as that in the first embodiment described with reference to FIG. 13 and performs basically the same processing. However, in this case, the hierarchization processing unit 111 may include at least one of the scalable adapted hierarchization processing unit 122 and the scalable nonadapted hierarchization processing unit 123. That is, hierarchization may be performed according to a method adapted to scalable decoding or a method that is not adapted to scalable decoding.

In addition, the control unit 121 controls hierarchization through a method using the present technology described above in <2. Control of reference relations>. For example, the control unit 121 merges points (nodes) of a plurality of levels to construct reference relations. For example, the control unit 121 derives predictive values of predictive points of a plurality of levels with reference to reference points of the same levels. For example, the control unit 121 compares the number of points (the number of nodes) of a level that is a processing target of attribute data to that of a level higher by one level. Then, if the number of points of the level that is a processing target is not sufficiently greater than that of the level higher by one level (if a predetermined number of points have not increased (e.g., the number of points decreases)), the control unit 121 merges the points of the level that is a processing target into the level higher by one level.

Further, the control unit 121 generates control information (e.g., merge_lower_lod_flag) represents whether reference relations have been constructed according to merging with another level for each level and supplies the control information to the quantization unit 112 to cause the control information to be transmitted to a decoding side. When the encoding unit 113 acquires the control information through the quantization unit 112, the encoding unit 113 includes the control information in encoded data of attribute data.

By performing hierarchization as described above, the hierarchization processing unit 111 can construct reference relations in a configuration in which the number of points monotonically increases from a higher level to a lower level. Accordingly, the encoding device 100 can curb reduction in encoding efficiency.

Flow of Encoding Processing

Next, processing executed by the encoding device 100 in this case will be described. In this case, the encoding device 100 also executes encoding processing through basically the same flow as that in the first embodiment described with reference to FIG. 14. However, the attribute information encoding unit 104 performs processing using the present technology described above <2. Control of reference relations> in step S104. For example, the attribute information encoding unit 104 merges points (nodes) of a plurality of levels to construct reference relations.

Flow of Attribute Information Encoding Processing

Furthermore, in this case, the attribute information encoding unit 104 performs attribute information encoding processing executed in step S104 of FIG. 14 through basically the same flow as that in the first embodiment described with reference to FIG. 15. However, the hierarchization processing unit 111 performs processing using the present technology described above in <2. Control of reference relations> in step S111.

Flow of Hierarchization Processing

An example of the flow of hierarchization processing in this case will be described with reference to the flowchart of FIG. 24.

When hierarchization processing is started, the control unit 121 compares the number of nodes of each level to the number of nodes of a level higher by one level in step S301.

In step S302, the control unit 121 includes (merge) nodes of a level having the number of nodes which is not sufficiently greater than the number of nodes of a level higher by one level (e.g., having a decreased number of nodes) in nodes of a level higher by one level.

In step S303, the scalable adapted hierarchization processing unit 122 or the scalable nonadapted hierarchization processing unit 123 is controlled by the control unit 121 to set a reference point from a level higher by one level for each level. That is, reference relations between levels are constructed.

Processing of steps S304 to S306 is executed in the same manner as processing (FIG. 16) of steps S124 to S126.

When processing of step S306 ends, hierarchization processing ends and processing returns to FIG. 15.

By executing processing as described above, the hierarchization processing unit 111 can construct reference relations in a configuration in which the number of points monotonically increases from a higher level to a lower level. Accordingly, the encoding device 100 can curb reduction in encoding efficiency.

6. Fourth Embodiment

Decoding Device

Next, another example of a device to which the present technology described above in <2. Control of reference relations> is applied will be described. In this case, the decoding device 200 has the same configuration as that in the first embodiment described with reference to FIG. 17 and performs basically the same processing. However, the attribute information decoding unit 204 decodes attribute data using the present technology described above in <2. Control of reference relations>. For example, the attribute information decoding unit 204 reconstructs predictive points of a plurality of levels with reference to reference points of the same levels on the basis of construction of reference relations according to merging of points (nodes) of a plurality of levels in inverse hierarchization.

Attribute Information Decoding Unit

Further, in this case, the attribute information decoding unit 204 also has the same configuration as that in the first embodiment described with reference to FIG. 18 and performs basically the same processing. However, the inverse hierarchization processing unit 213 performs hierarchization using the present technology described above in <2. Control of reference relations>. For example, the inverse hierarchization processing unit 213 reconstructs predictive points of a plurality of levels with reference to reference points of the same levels on the basis of construction of reference relations according to merging of points (nodes) of a plurality of levels in inverse hierarchization.

Inverse Hierarchization Processing Unit

Further, in this case, the inverse hierarchization processing unit 213 also has the same configuration as that in the first embodiment described with reference to FIG. 19 and performs basically the same processing. However, in this case, the inverse hierarchization processing unit 213 may include at least one of the scalable nonadapted inverse hierarchization processing unit 222 and the scalable adapted inverse hierarchization processing unit 223. That is, inverse hierarchization may be performed according to a method adapted to scalable decoding or a method that is not adapted to scalable decoding.

In addition, the control unit 221 controls inverse hierarchization through a method using the present technology described above in <2. Control of reference relations>. For example, the control unit 221 reconstructs predictive points of a plurality of levels with reference to reference points of the same levels on the basis of construction of reference relations according to merging of points (nodes) of a plurality of levels. For example, the control unit 221 appropriately merges points of a level that is a processing target into a level higher by one level to construct reference relations on the basis of control information (e.g., merge_lower_lod_flag) representing whether reference relations have been constructed according to merging with another level.

By performing inverse hierarchization as described above, the inverse hierarchization processing unit 213 can correctly inversely hierarchize attribute data in which reference relations in a configuration in which the number of points monotonically increases from a higher level to a lower level have been constructed. Accordingly, the decoding device 200 can curb reduction in encoding efficiency.

Flow of Decoding Processing

Next, processing executed by the decoding device 200 in this case will be described. In this case, the decoding device 200 also executes encoding processing through basically the same flow as that in the first embodiment described with reference to FIG. 20. However, the attribute information decoding unit 204 performs processing using the present technology described above in <2. Control of reference relations> in step S206. For example, the attribute information encoding unit 104 reconstructs predictive points of a plurality of levels with reference to reference points of the same levels on the basis of construction of reference relations according to merging of points (nodes) of a plurality of levels.

Flow of Attribute Information Decoding Processing

Furthermore, in this case, the attribute information decoding unit 204 performs attribute information decoding processing executed in step S206 of FIG. 20 through basically the same flow as that in the first embodiment described with reference to FIG. 21. However, the inverse hierarchization processing unit 213 performs processing using the present technology described above in <2. Control of reference relations> in step S2123.

Flow of Hierarchization Processing

An example of the flow of hierarchization processing in this case will be described with reference to the flowchart of FIG. 24.

When hierarchization processing is started, the control unit 221 hierarchizes attribute data using geometry data in step S401.

In step S402, the control unit 221 includes nodes of a level having the number of nodes which is not sufficiently greater than the number of nodes of a level higher by one level in the nodes of the level higher by one level on the basis of control information (e.g., merge_lower_lod_flag) representing whether reference relations have been constructed according to merging with another level.

In step S403, the scalable nonadapted inverse hierarchization processing unit 222 (or the scalable adapted inverse hierarchization processing unit 223) derives a predictive value of a predictive point using a reference point of a level higher by one level for each level.

In step S404, the scalable nonadapted inverse hierarchization processing unit 222 (or the scalable adapted inverse hierarchization processing unit 223) adds the predictive value to difference values to reconstruct attribute information of the predictive point for each level.

In step S405, the scalable nonadapted inverse hierarchization processing unit 222 (or the scalable adapted inverse hierarchization processing unit 223) merges attribute data of the predictive point and the reference point for each level.

When processing of step S405 ends, inverse hierarchization processing ends and processing returns to FIG. 21.

By executing processing as described above, the inverse hierarchization processing unit 213 can correctly inversely hierarchize attribute data in which reference relations in a configuration in which the number of points monotonically increases from a higher level to a lower level have been constructed. Therefore, the decoding device 200 can curb reduction in encoding efficiency.

7. Supplement

Hierarchization/Inverse Hierarchization Method

Although lifting has been exemplified above as an attribute information hierarchization/inverse hierarchization method, the present technology can be applied to any technology for hierarchizing attribute information. That is, an attribute information hierarchization/inverse hierarchization method may be a method other than lifting.

Control Information

Control information about the present technology described in each embodiment may be transmitted from an encoding side to a decoding side. For example, control information (e.g., enabled_flag) for controlling whether to permit (or prohibit) application of the above-described present technology may be transmitted. In addition, for example, control information for designating a range (e.g., an upper limit or a lower limit of a block size or both thereof, slices, pictures, sequences, components, views, layers, and the like) in which application of the above-described present technology is permitted (or prohibited) may be transmitted.

Surroundings/Vicinity

Meanwhile, positional relations such as "surroundings" and "vicinity" in the present description include not only spatial positional relations but also temporal positional relations.

Computer

A series of processing described above can be executed by hardware or software. In the case where the series of processing is executed by software, a program that configures the software is installed on a computer. Here, the computer includes, for example, a computer built in dedicated hardware and a general-purpose personal computer on which various programs are installed to be able to execute various functions.

Figure 26:
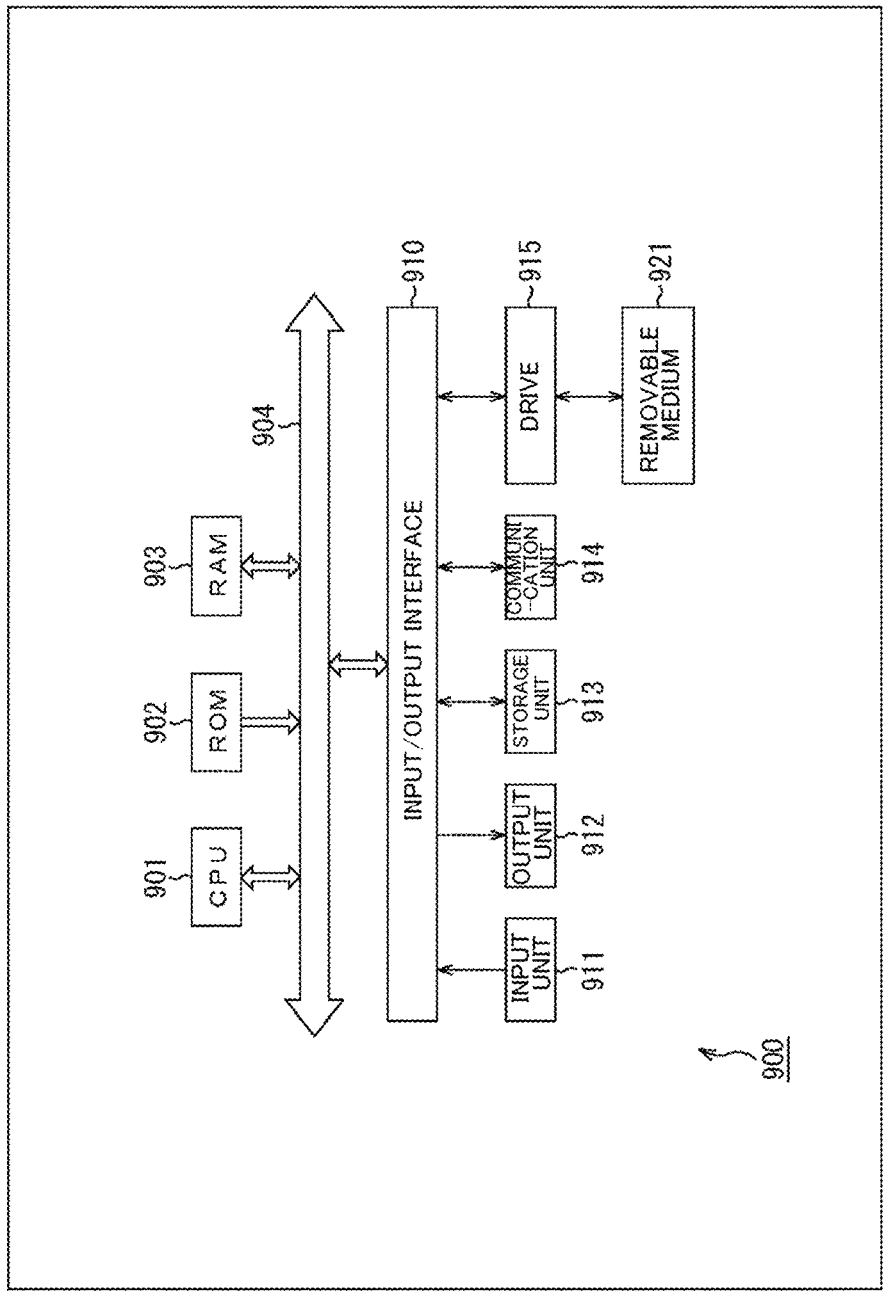
FIG. 26 is a block diagram illustrating an example of major components of a computer.

FIG. 26 is a block diagram illustrating an example of hardware configuration of a computer that executes the series of processing described above according to a program.

In a computer 900 illustrated in FIG. 26, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a non-volatile memory, and the like. The communication unit 914 includes, for example, a network interface. The drive 915 drives a removable medium 921 such as a magnetic disk, an optical disc, a magneto-optical disk, or a semiconductor memory.

In the computer configured as above, for example, the CPU 901 performs the above-described series of processes by loading a program stored in the storage unit 913 to the RAM 903 via the input/output interface 910 and the bus 904 and executing the program. Data and the like necessary for the CPU 901 to execute various kinds of processing are also appropriately stored in the RAM 903.

The program executed by the computer can be recorded on, for example, the removable medium 921 as a package medium or the like so as to be applied. In such a case, the program can be installed in the storage unit 913 via the input/output interface 910 by inserting the removable medium 921 into the drive 915.

Further, the program may also be provided via a wired or wireless transmission medium such as a local area network, the Internet, or digital satellite broadcasting. In such a case, the program can be received by the communication unit 914 and installed in the storage unit 913.

In addition, this program can be installed in advance in the ROM 902 or the storage unit 913.

Application Target of Present Technology

Although cases in which the present technology is applied to encoding/decoding of point cloud data has been described above, the present technology is not limited to such examples and can be applied to encoding/decoding of 3D data in any standard. That is, various types of processing such as encoding/decoding methods, and specifications of various types of data such as 3D data and metadata may are arbitrary as long as they are not contradict the above-described present technology. In addition, the above-described some processing and specifications may be omitted as long as it does not contradict the present technology.

Moreover, although the encoding device 100 and the decoding device 200 have been described above as examples to which the present technology is applied, the present technology can be applied to any configuration.

For example, the present technology can be applied to various electronic apparatuses such as transmitters and receivers (e.g., television receivers and cellular phones) in satellite broadcasting, wired broadcasting such as cable TV, transmission on the Internet, transmission to terminals according to cellular communication, and the like, or devices (e.g., hard disk recorders and cameras) that record images in media such as an optical disc, a magnetic disk, and a flash memory or reproduce images from these storage media.

Furthermore, for example, the present technology can also be implemented as a part of components of a device, such as a processor (e.g., a video processor) serving as a system large scale integration (LSI) circuit or the like, a module (e.g., a video module) using a plurality of processors and the like, a unit (e.g., a video unit) using a plurality of modules and the like, or a set (e.g., a video set) of units having additional other functions.

In addition, the present technology can also be applied to, for example, a network system composed of a plurality of devices. For example, the present technology can be implemented as cloud computing in which a function is shared and processed in common by a plurality of devices via a network. For example, the present technology may also be implemented in a cloud service that provides services with respect to images (moving images) to any terminals such as a computer, an audio visual (AV) apparatus, a portable information processing terminal, an Internet of Things (IoT) device, and the like.

Meanwhile, in the present description, the system means a set of a plurality of components (devices, modules (parts), etc.), and it does not matter whether or not all the components are arranged in a single housing. Therefore, a plurality of devices housed in separate housings and connected via a network, and one device in which a plurality of modules are housed in one housing are both systems.

Fields/Applications to Which Present Technology is Applicable

Systems, devices, processing units and the like to which the present technology is applied can be used, for example, in any field such as transportation, medical care, crime prevention, agriculture, livestock industry, mining, beauty, factories, home appliances, weather, and nature monitoring. In addition, applications thereof is arbitrary.

Others

Meanwhile, in the present description, "flag" is information for identifying a plurality of states and includes not only information used to identify two states of true (1) and false (0) but also information capable of identifying three or more states. Accordingly, this "flag" can have not only two values of 1/0 but also three or more values. That is, the number of bits constituting this "flag" is arbitrary and it may be 1 bit or a plurality of bits. In addition, identification information (also including a flag) is assumed to have not only a form in which the identification information is included in a bitstream but also a form in which difference information of the identification information with respect to certain reference information is included in a bitstream, and thus "flag" and "identification information " includes only the information itself but also difference information with respect to reference information in the present description.

Furthermore, various types of information (metadata and the like) about encoded data (bitstreams) may be transmitted or recorded in any form as long as they are associated with the encoded data. Here, the term "associate" means, for example, making other information available (linkable) when one piece of information is processed. That is, associated information may be collected as one piece of data or may be individual information. For example, information associated with encoded data (image) may be transmitted on a transmission path different from that for the encoded data (image). Further, for example, information associated with encoded data (image) may be recorded on a recording medium (or another recording area of the same recording medium) different from that for the encoded data (image). Meanwhile, this "association" may be for part of data, not the entire data. For example, an image and information corresponding to the image may be associated with each other in an arbitrary unit such as a plurality of frames, one frame, or a part within a frame.

Meanwhile, in the present description, the terms "compose", "multiplex", "add", "integrate", "include", "store", "put in", "introduce", "insert", and the like mean combining a plurality of things into one, for example, combining encoded data and metadata into one piece of data and means a method of the aforementioned "association".

In addition, embodiments of the present technology are not limited to the above-described embodiments, and various modifications can be made without departing from the gist of the present technology.

For example, a configuration described as one device (or one processing unit) may be divided to be configured as a plurality of devices (or processing units). Conversely, a configuration described as a plurality of devices (or processing units) in the above description may be collectively configured as one device (or one processing unit). Further, it goes without saying that components other than those described above may be added to the configuration of each device (or each processing unit). Furthermore, a part of the configuration of one device (or one processing unit) may be included in the configuration of another device (or another processing unit) as long as the configuration or operation of the entire system is substantially the same.

Further, for example, the program described above may be executed in any device. In such a case, the device may have necessary functions (functional blocks and the like) to be able to obtain necessary information.

Further, for example, respective steps of a flowchart may be executed by one device or by a plurality of devices in a shared manner. Furthermore, in a case where a plurality of kinds of processing are included in a single step, the plurality of kinds of processing may be executed by one device or by a plurality of devices in a shared manner. In other words, a plurality of kinds of processing included in a single step may be executed as processing for a plurality of steps. Conversely, processing described as a plurality of steps may be collectively executed as a single step.

In addition, for example, a program executed by a computer may be executed such that processing steps describing the program is executed in chronological order according to the order described in the present description or are executed in parallel or individually at a necessary timing such as in response to a call. That is, as long as no contradiction arises, each processing step may be executed in an order different from the order described above. Furthermore, the kinds of processing of steps describing the program may be executed in parallel with the processing of another program or may be executed in combination with the processing of the other program.

In addition, for example, a plurality of technologies with respect to the present technology can be implemented independently alone as long as no contradiction arises, for example. It goes without saying that any number of the present technologies can also be implemented in parallel. For example, part or all of the present technology described in any of the embodiments may be implemented in combination with part or all of the present technology described in the other embodiments. Further, part or all of the above-described present technology may be implemented in combination with other technologies not described above.

Meanwhile, the present technique can also take the following configurations.

(1) An information processing device including
a hierarchization unit configured to, with respect to attribute information of each point of a point cloud representing an object in a three-dimensional shape as a set of points, perform hierarchization of the attribute information by recursively repeating processing of classifying points as a predictive point or a reference point, deriving a predictive value of the attribute information of the predictive point using the attribute information of the reference point, and deriving a difference value between the attribute information of the predictive point and the predictive value for the reference point, wherein the hierarchization unit performs the hierarchization using a plurality of hierarchization methods to generate different levels according to the hierarchization methods.

(2) The information processing device according to (1), wherein the hierarchization unit generates a level higher than a predetermined level according to a hierarchization method that is not adapted to scalable decoding and generates a level lower than the predetermined level according to a hierarchization method adapted to scalable decoding.

(3) The information processing device according to (2), wherein the hierarchization unit generates levels in ascending order from lowest to highest.

(4) The information processing device according to any one of (1) to (3), further including:
a generation unit configured to generate control information about hierarchization of the attribute information performed by the hierarchization unit; and
an encoding unit configured to encode the attribute information hierarchized by the hierarchization unit and to generate encoded data of the attribute information including the control information generated by the generation unit.

(5) An information processing method for generating different levels according to a plurality of hierarchization methods using the plurality of hierarchization methods, with respect to attribute information of each point of a point cloud representing an object in a three-dimensional shape as a set of points, at the time of performing hierarchization of the attribute information by recursively repeating processing of classifying points as a predictive point or a reference point, deriving a predictive value of the attribute information of the predictive point using the attribute information of the reference point, and deriving a difference value between the attribute information of the predictive point and the predictive value for the reference point.

(6) An information processing device including
an inverse hierarchization unit configured to, with respect to attribute information of each point of a point cloud representing an object in a three-dimensional shape as a set of points, perform inverse hierarchization on the attribute information hierarchized by recursively repeating processing of classifying points as a predictive point or a reference point, deriving a predictive value of the attribute information of the predictive point using the attribute information of the reference point, and deriving a difference value between the attribute information of the predictive point and the predictive value for the reference point, wherein
the inverse hierarchization unit uses a plurality of hierarchization methods to perform the inverse hierarchization on different levels according to the hierarchization methods.

(7) The information processing device according to (6), wherein the inverse hierarchization unit performs the inverse hierarchization on levels higher than a predetermined level according to a hierarchization method that is not adapted to scalable decoding and performs the inverse hierarchization on levels lower than the predetermined level according to a hierarchization method adapted to scalable decoding.

(8) The information processing device according to (7), wherein the inverse hierarchization unit identifies the predetermined level on the basis of first control information representing a range of levels to which the hierarchization method adapted to scalable decoding is applied.

(9) The information processing device according to (8), wherein the inverse hierarchization unit identifies the predetermined level on the basis of the first control information with respect to attribute information for which second control information representing whether the hierarchization method adapted to scalable decoding is applicable represents that the hierarchization method adapted to scalable decoding is applicable.

(10) The information processing device according to any one of (6) to (9), further including
a decoding unit configured to decode encoded data of the attribute information to generate the attribute information, wherein
the inverse hierarchization unit performs the inverse hierarchization on the attribute information obtained by decoding the encoded data through the decoding unit.

(11) An information processing method for performing inverse hierarchization on different levels according to a plurality of hierarchization methods using the plurality of hierarchization methods, with respect to attribute information of each point of a point cloud representing an object in a three-dimensional shape as a set of points, at the time of performing the inverse hierarchization of the attribute information hierarchized by recursively repeating processing of classifying points as a predictive point or a reference point, deriving a predictive value of the attribute information of the predictive point using the attribute information of the reference point, and deriving a difference value between the attribute information of the predictive point and the predictive value for the reference point.

(12) An information processing device including
a hierarchization unit configured to, with respect to attribute information of each point of a point cloud representing an object in a three-dimensional shape as a set of points, perform hierarchization of the attribute information by recursively repeating processing of classifying points as a predictive point or a reference point, deriving a predictive value of the attribute information of the predictive point using the attribute information of the reference point, and deriving a difference value between the attribute information of the predictive point and the predictive value for the reference point, wherein
the hierarchization unit derives the predictive values of the predictive points of a plurality of levels with reference to the reference points of the same levels.

(13) The information processing device according to (12), wherein the hierarchization unit calculates the predictive value of the predictive point of a level having the number of points that is not sufficiently greater than the number of points of a level higher by one level with reference to the reference point of a level higher by two levels.

(14) The information processing device according to (12) or (13), further including:
a generation unit configured to generate control information representing whether reference relations have been constructed according to merging with another level; and
an encoding unit configured to encode the attribute information hierarchized by the hierarchization unit and to generate encoded data of the attribute information including the control information generated by the generation unit.

(15) An information processing method for,
with respect to attribute information of each point of a point cloud representing an object in a three-dimensional shape as a set of points, at the time of performing hierarchization of the attribute information by recursively repeating processing of classifying points as a predictive point or a reference point, deriving a predictive value of the attribute information of the predictive point using the attribute information of the reference point, and deriving a difference value between the attribute information of the predictive point and the predictive value for the reference point, deriving the predictive values of the predictive points of a plurality of levels with reference to the reference points of the same levels.

(16) An information processing device including an inverse hierarchization unit configured to, with respect to attribute information of each point of a point cloud representing an object in a three-dimensional shape as a set of points, perform inverse hierarchization on the attribute information hierarchized by recursively repeating processing of classifying points as a predictive point or a reference point, deriving a predictive value of the attribute information of the predictive point using the attribute information of the reference point, and deriving a difference value between the attribute information of the predictive point and the predictive value for the reference point, wherein the inverse hierarchization unit derives the predictive values of the attribute information of the predictive points of a plurality of levels with reference to the attribute information of the reference points of the same levels and generates the attribute information of the predictive point by adding the derived predictive values to the difference value at the time of the inverse hierarchization.

(17) The information processing device according to (16), wherein the inverse hierarchization unit identifies a level that is a reference destination of a processing target level on the basis of control information representing whether the same level as another level is referred to and derives the predictive value of the attribute information of the predictive point of the processing target level with reference to the attribute information of the reference point of the identified level at the time of the inverse hierarchization.

(18) The information processing device according to (16) or (17), wherein the inverse hierarchization unit derives, with respect to a level having the number of points that is not sufficiently greater than the number of points of a level higher by one level, the predictive value of the attribute information of the predictive point with reference to the attribute information of the reference point of a level higher by two levels.

(19) The information processing device according to any one of (16) to (18), further including a decoding unit configured to decode encoded data of the attribute information to generate the attribute information, wherein the inverse hierarchization unit performs the inverse hierarchization on the attribute information reconstructed by the decoding unit decoding the encoded data.

(20) An information processing method for, with respect to attribute information of each point of a point cloud representing an object in a three-dimensional shape as a set of points, at the time of performing inverse hierarchization of the attribute information hierarchized by recursively repeating processing of classifying points as a predictive point or a reference point, deriving a predictive value of the attribute information of the predictive point using the attribute information of the reference point, and deriving a difference value between the attribute information of the predictive point and the predictive value for the reference point, deriving the predictive values of the attribute information of the predictive points of a plurality of levels with reference to the attribute information of the reference points of the same levels and generating the attribute information of the predictive point by adding the derived predictive values to the difference values.

REFERENCE SIGNS LIST

100 Encoding device
101 Position information encoding unit
102 Position information decoding unit
103 Point cloud generation unit
104 Attribute information encoding unit
105 Bitstream generation unit
111 Hierarchization processing unit
112 Quantization unit
113 Encoding unit
121 Control unit
122 Scalable adapted hierarchization processing unit
123 Scalable nonadapted hierarchization processing unit
124 Inversion unit
125 Weighting unit
200 Decoding device
201 Decoding target LOD depth setting unit
202 Encoded data extraction unit
203 Position information decoding unit
204 Attribute information decoding unit
205 Point cloud generation unit
211 Decoding unit
212 Inverse quantization unit
213 Inverse hierarchization processing unit
221 Control unit
222 Scalable nonadapted inverse hierarchization processing unit
223 Scalable adapted inverse hierarchization processing unit

The invention claimed is:

1. An information processing device for processing attribute information of each point of a point cloud representing an object in a three-dimensional shape as a set of points, the information processing device comprising a hierarchization unit configured to recursively repeat processing of, among points classified as a predictive point or a reference point, deriving a difference value between a predictive value of the attribute information of the predictive point derived using the attribute information of the reference point and the attribute information of the predictive point for the reference point to perform hierarchization of the attribute information, wherein the hierarchization unit hierarchizes a first level using a first hierarchization method and hierarchizes a second level different from the first level using a second hierarchization method different from the first hierarchization method, the first hierarchization method is not adapted to scalable decoding and the second hierarchization method is adapted to scalable decoding, and the hierarchization unit is implemented via at least one processor.

2. The information processing device according to claim 1, wherein the hierarchization unit generates a level higher than a predetermined level including the first level according to the first hierarchization method that is not adapted to scalable decoding and generates a level lower than the predetermined level including the second level according to the second hierarchization method adapted to scalable decoding.

3. The information processing device according to claim 2, wherein the hierarchization unit generates levels in ascending order from lowest to highest.

4. The information processing device according to claim 1, further comprising:
  a generation unit configured to generate control information about hierarchization of the attribute information performed by the hierarchization unit; and
  an encoding unit configured to encode the attribute information hierarchized by the hierarchization unit and to generate encoded data of the attribute information including the control information generated by the generation unit, wherein
  the generation unit and the encoding unit are each implemented via at least one processor.

5. An information processing method for generating different levels according to a plurality of hierarchization methods using the plurality of hierarchization methods, with respect to attribute information of each point of a point cloud representing an object in a three-dimensional shape as a set of points, at a time of performing hierarchization of the attribute information by recursively repeating processing of classifying points as a predictive point or a reference point, deriving a predictive value of the attribute information of the predictive point using the attribute information of the reference point, and deriving a difference value between the attribute information of the predictive point and the predictive value for the reference point, wherein
  a first hierarchization method of the plurality of hierarchization methods is not adapted to scalable decoding and a second hierarchization method of the plurality of hierarchization methods is adapted to scalable decoding.

6. An information processing device for processing attribute information of each point of a point cloud representing an object in a three-dimensional shape as a set of points, the information processing device comprising
  an inverse hierarchization unit configured to perform inverse hierarchization on attribute information hierarchized by recursively repeating processing of, among points classified as a predictive point or a reference point, deriving a difference value between a predictive value of the attribute information of the predictive point derived using the attribute information of the reference point and the attribute information of the predictive point for the reference point, wherein
  the inverse hierarchization unit inversely hierarchizes a first level using a first hierarchization method and inversely hierarchizes a second level different from the first level using a second hierarchization method different from the first hierarchization method,
  the first hierarchization method is not adapted to scalable decoding and the second hierarchization method is adapted to scalable decoding, and
  the inverse hierarchization unit is implemented via at least one processor.

7. The information processing device according to claim 6, wherein the inverse hierarchization unit performs the inverse hierarchization on levels higher than a predetermined level including the first level according to the first hierarchization method that is not adapted to scalable decoding and performs the inverse hierarchization on levels lower than the predetermined level including the second level according to the second hierarchization method adapted to scalable decoding.

8. The information processing device according to claim 7, wherein the inverse hierarchization unit identifies the predetermined level on a basis of first control information representing a range of levels to which the second hierarchization method adapted to scalable decoding is applied.

9. The information processing device according to claim 8, wherein the inverse hierarchization unit identifies the predetermined level on the basis of the first control information with respect to attribute information for which second control information representing whether the second hierarchization method adapted to scalable decoding is applicable represents that the second hierarchization method adapted to scalable decoding is applicable.

10. The information processing device according to claim 6, further comprising
  a decoding unit configured to decode encoded data of the attribute information to generate the attribute information, wherein
  the inverse hierarchization unit performs the inverse hierarchization on the attribute information obtained by decoding the encoded data through the decoding unit, and
  the decoding unit is implemented via at least one processor.

11. An information processing method for performing inverse hierarchization on different levels according to a plurality of hierarchization methods using the plurality of hierarchization methods, with respect to attribute information of each point of a point cloud representing an object in a three-dimensional shape as a set of points, at a time of performing the inverse hierarchization of the attribute information hierarchized by recursively repeating processing of classifying points as a predictive point or a reference point, deriving a predictive value of the attribute information of the predictive point using the attribute information of the reference point, and deriving a difference value between the attribute information of the predictive point and the predictive value for the reference point, wherein
  a first hierarchization method of the plurality of hierarchization methods is not adapted to scalable decoding and a second hierarchization method of the plurality of hierarchization methods is adapted to scalable decoding.

12. An information processing device for processing attribute information of each point of a point cloud representing an object in a three-dimensional shape as a set of points, the information processing device comprising
  a hierarchization unit configured to recursively repeat processing of, among points classified as a predictive point or a reference point, deriving a difference value between a predictive value of the attribute information of the predictive point derived using the attribute information of the reference point and the attribute information of the predictive point for the reference point to perform hierarchization of the attribute information, wherein
  the hierarchization unit derives the predictive values of the predictive points of a plurality of levels with reference to the reference points of same levels,
  the hierarchization unit calculates the predictive value of the predictive point of a level having a number of points that is not greater by a predetermined number of points than a number of points of a level higher by one level, and
  the hierarchization unit is implemented via at least one processor.

13. The information processing device according to claim 12, wherein the hierarchization unit calculates the predictive value of the predictive point of the level having the number of points that is not greater by the predetermined number of points than the number of points of the level higher by one level with reference to the reference point of a level higher by two levels.

14. The information processing device according to claim 12, further comprising:
a generation unit configured to generate control information representing whether reference relations have been constructed according to merging with another level; and
an encoding unit configured to encode the attribute information hierarchized by the hierarchization unit and to generate encoded data of the attribute information including the control information generated by the generation unit, wherein
the generation unit and the encoding unit are each implemented via at least one processor.

15. An information processing method for,
with respect to attribute information of each point of a point cloud representing an object in a three-dimensional shape as a set of points, at a time of performing hierarchization of the attribute information by recursively repeating processing of classifying points as a predictive point or a reference point, deriving a predictive value of the attribute information of the predictive point using the attribute information of the reference point, and deriving a difference value between the attribute information of the predictive point and the predictive value for the reference point,
deriving the predictive values of the predictive points of a plurality of levels with reference to the reference points of same levels, and
calculating the predictive value of the predictive point of a level having a number of points that is not greater by a predetermined number of points than a number of points of a level higher by one level.

16. An information processing device for processing attribute information of each point of a point cloud representing an object in a three-dimensional shape as a set of points, the information processing device comprising
an inverse hierarchization unit configured to perform inverse hierarchization on attribute information hierarchized by recursively repeating processing of, among points classified as a predictive point or a reference point, deriving a difference value between a predictive value of the attribute information of the predictive point derived using the attribute information of the reference point and the attribute information of the predictive point for the reference point, wherein
the inverse hierarchization unit derives the predictive values of the attribute information of the predictive points of a plurality of levels with reference to the attribute information of the reference points of same levels and generates the attribute information of the predictive point by adding the derived predictive values to the difference values at a time of the inverse hierarchization,
the inverse hierarchization unit derives, with respect to a level having a number of points that is not greater by a predetermined number of points than a number of points of a level higher by one level, the predictive value of the attribute information of the predictive point, and
the inverse hierarchization unit is implemented via at least one processor.

17. The information processing device according to claim 16, wherein the inverse hierarchization unit identifies a level that is a reference destination of a processing target level on a basis of control information representing whether a same level as another level is referred to and derives the predictive value of the attribute information of the predictive point of the processing target level with reference to the attribute information of the reference point of the identified level at the time of the inverse hierarchization.

18. The information processing device according to claim 16, wherein the inverse hierarchization unit derives, with respect to the level having the number of points that is not greater by a predetermined number of points than the number of points of the level higher by one level, the predictive value of the attribute information of the predictive point with reference to the attribute information of the reference point of a level higher by two levels.

19. The information processing device according to claim 16, further comprising
a decoding unit configured to decode encoded data of the attribute information to generate the attribute information, wherein
the inverse hierarchization unit performs the inverse hierarchization on the attribute information reconstructed by the decoding unit decoding the encoded data, and
the decoding unit is implemented via at least one processor.

20. An information processing method for,
with respect to attribute information of each point of a point cloud representing an object in a three-dimensional shape as a set of points, at a time of performing inverse hierarchization of the attribute information hierarchized by recursively repeating processing of classifying points as a predictive point or a reference point, deriving a predictive value of the attribute information of the predictive point using the attribute information of the reference point, and deriving a difference value between the attribute information of the predictive point and the predictive value for the reference point,
deriving the predictive values of the attribute information of the predictive points of a plurality of levels with reference to the attribute information of the reference points of same levels and generating the attribute information of the predictive point by adding the derived predictive values to the difference values, and
deriving, with respect to a level having a number of points that is not greater by a predetermined number of points than the number of points of a level higher by one level, the predictive value of the attribute information of the predictive point.

* * * * *